United States Patent [19]

Smith

[11] Patent Number: 5,300,870
[45] Date of Patent: Apr. 5, 1994

[54] THREE-PHASE MOTOR CONTROL

[76] Inventor: Otto J. M. Smith, 612 Euclid Ave., Berkeley, Calif. 94708

[21] Appl. No.: 867,067

[22] Filed: Apr. 10, 1992

Related U.S. Application Data

[63] Continuation-in-part of Ser. No. 593,795, Oct. 5, 1990.

[51] Int. Cl.⁵ .................................................. H02P 1/26
[52] U.S. Cl. ..................................... 318/768; 318/771; 318/749
[58] Field of Search ................ 318/768, 771, 767, 816, 318/817, 794, 795, 769, 770, 749, 254, 138, 780

[56] References Cited

U.S. PATENT DOCUMENTS

| | | | |
|---|---|---|---|
| 2,593,987 | 6/1951 | Courtney | 318/768 |
| 3,036,255 | 5/1962 | Lewus | 318/768 |
| 3,835,356 | 9/1974 | Soderholm | 318/768 |
| 4,464,756 | 3/1949 | Trickey | 318/795 |
| 4,484,125 | 11/1984 | Hertz | 318/768 |
| 4,642,545 | 2/1987 | Lewus | 318/749 |
| 4,792,740 | 12/1988 | Smith | 318/768 |

FOREIGN PATENT DOCUMENTS 473796 10/1937 United Kingdom ................ 318/768

Primary Examiner—William M. Shoop, Jr.
Assistant Examiner—John W. Cabeca
Attorney, Agent, or Firm—Flehr, Hohbach, Test, Albritton & Herbert

[57] ABSTRACT

A three-phase induction motor is driven efficiently from a single-phase power supply by reconnecting the motor windings and using two or more capacitors to provide balanced currents and voltages in the windings at preselected values of power. A similar method is used to drive a three-terminal conventional motor from a single-phase supply by using a tapped autotransformer with two different voltages and two different capacitors to excite the third motor terminal. Capacitor switching in all embodiments is controlled by feedback from the voltage across the winding with capacitor excitation.

69 Claims, 16 Drawing Sheets

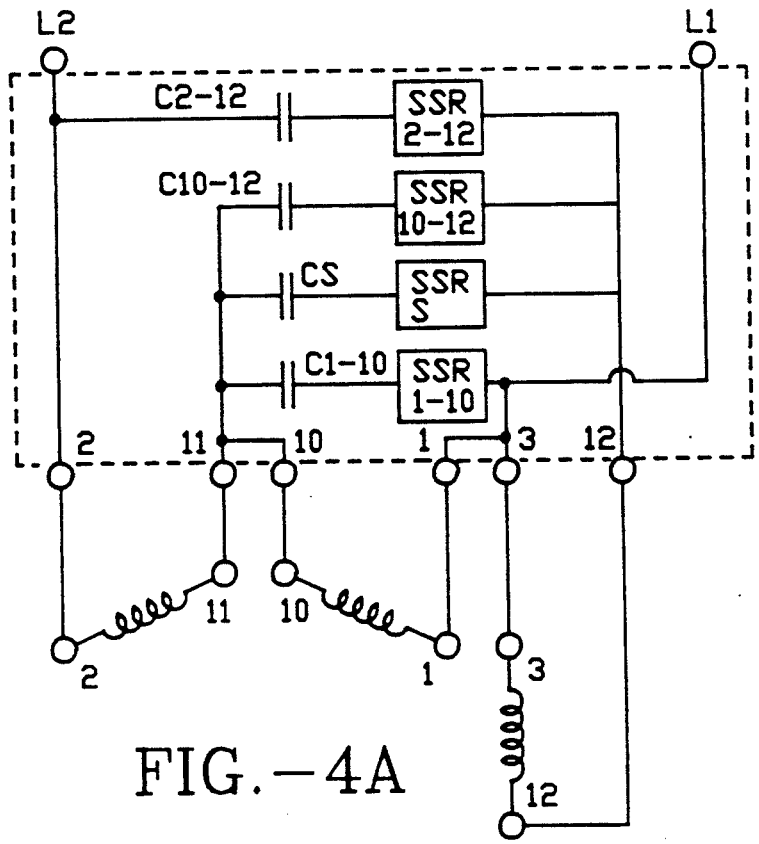
FIG.—4A
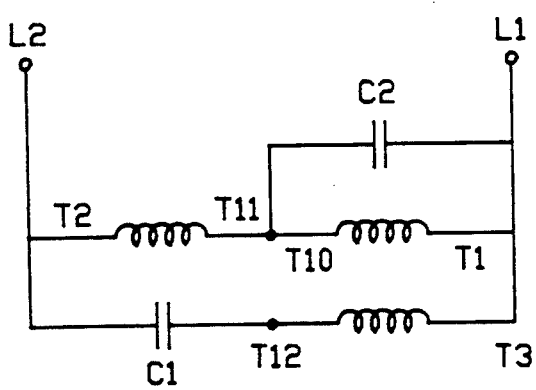
FIG.—4B
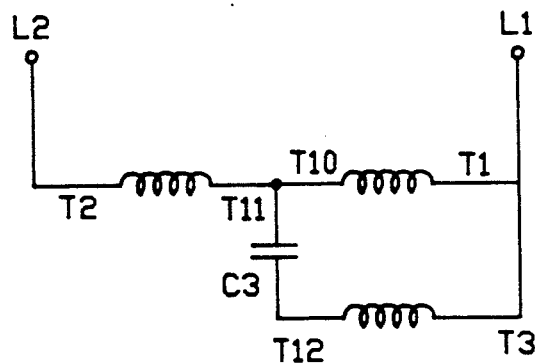
FIG.—4C
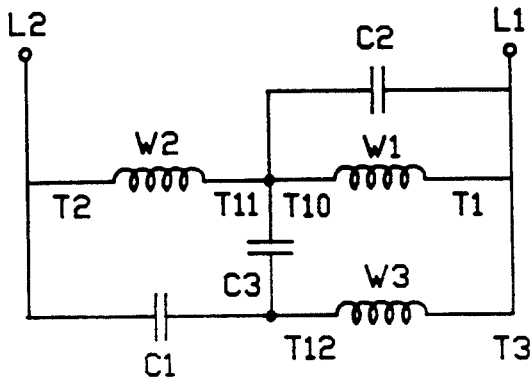
FIG.—4D

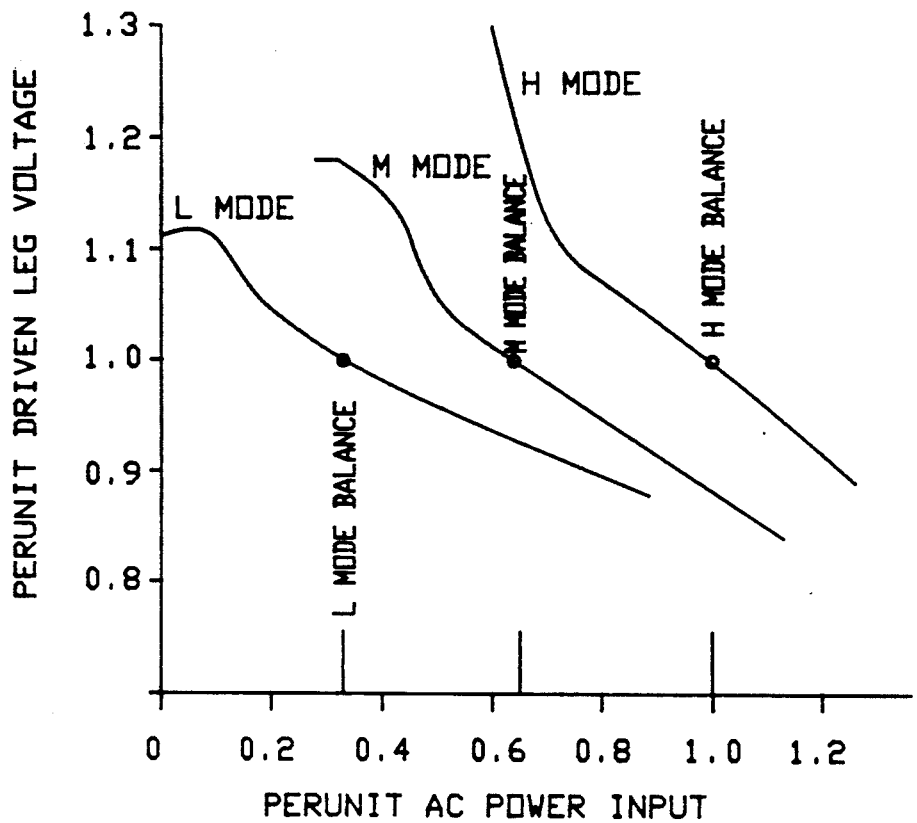
FIG.—9
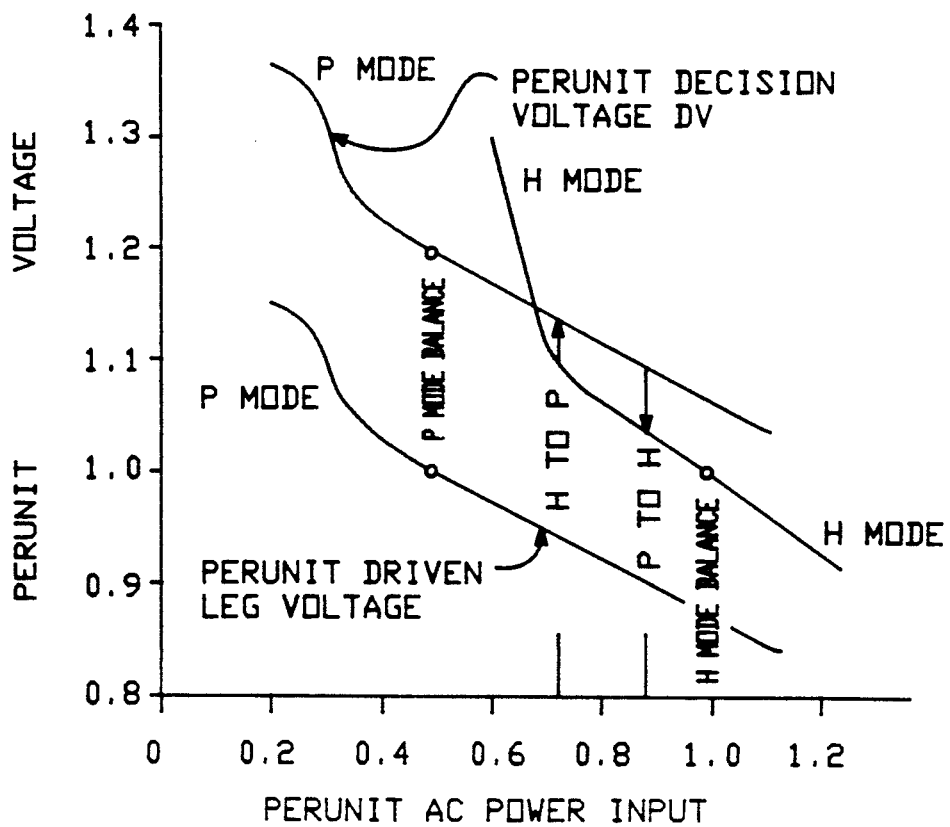
FIG.—12

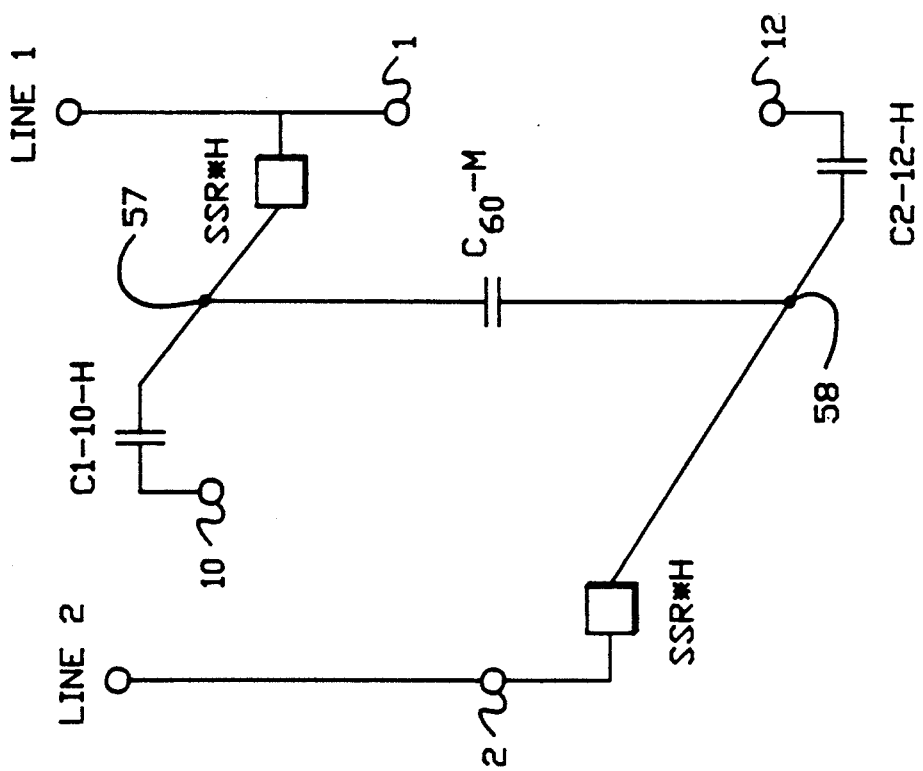
FIG.—14
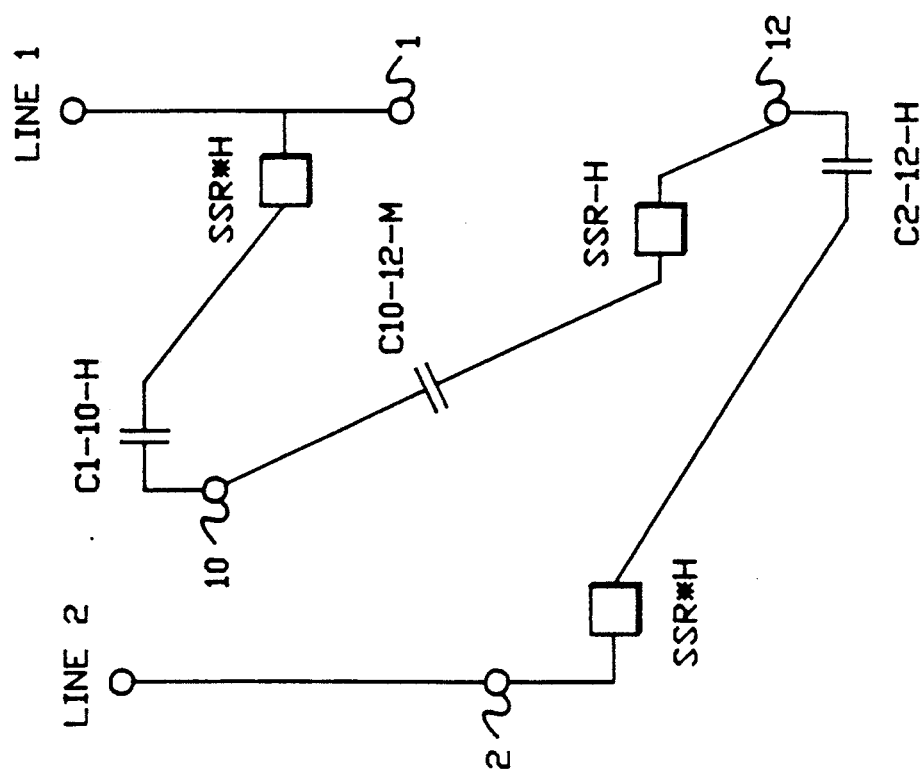
FIG.—13

IL1=IC1+IC2+I1-10

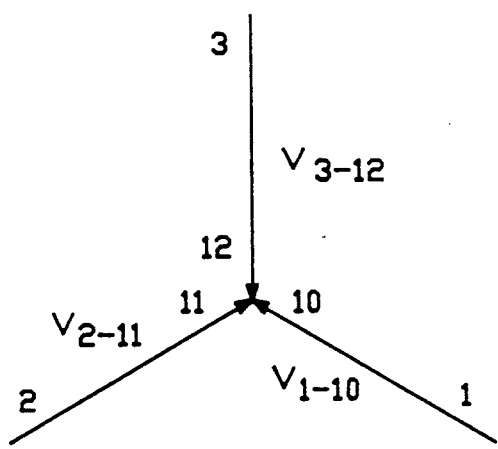
FIG.−20
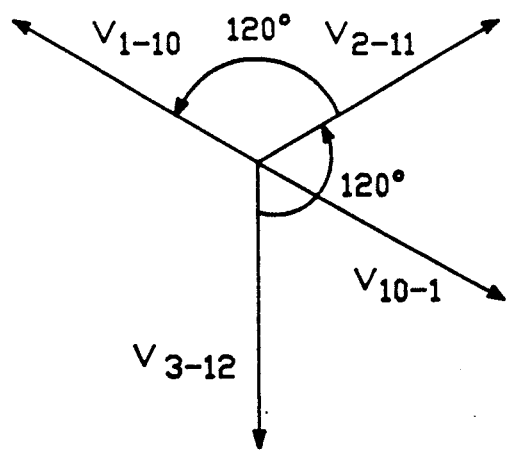
FIG.−21
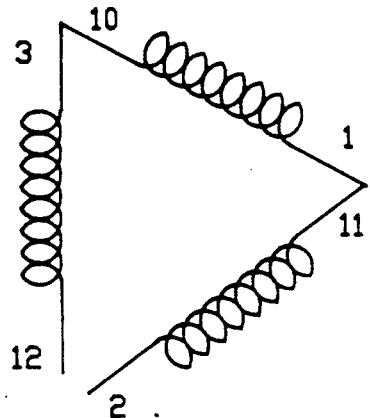
FIG.−22
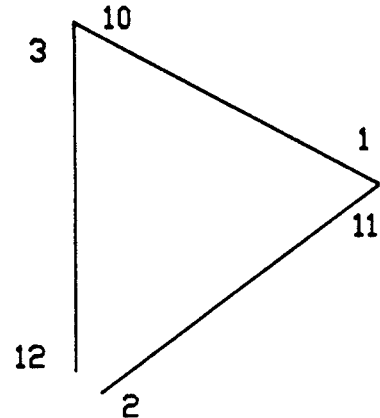
FIG.−23
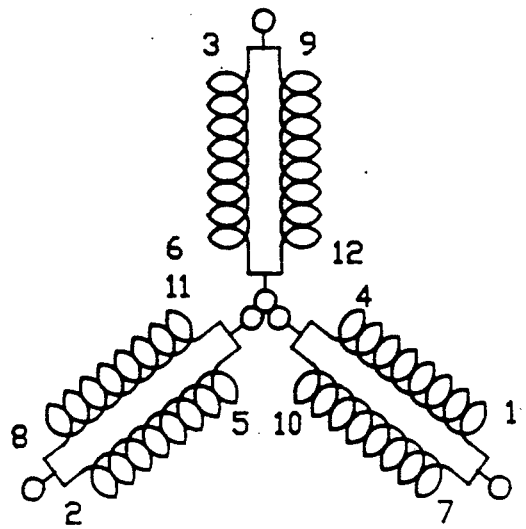
FIG.−24
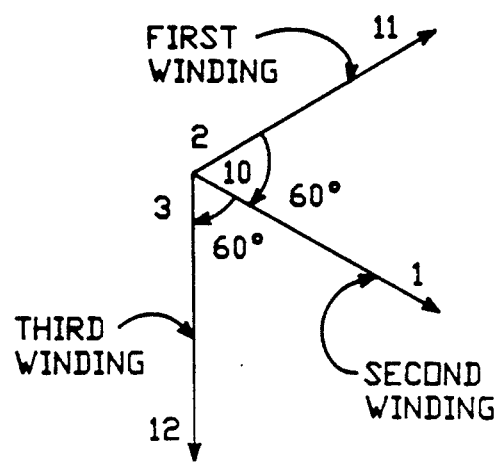
FIG.−25

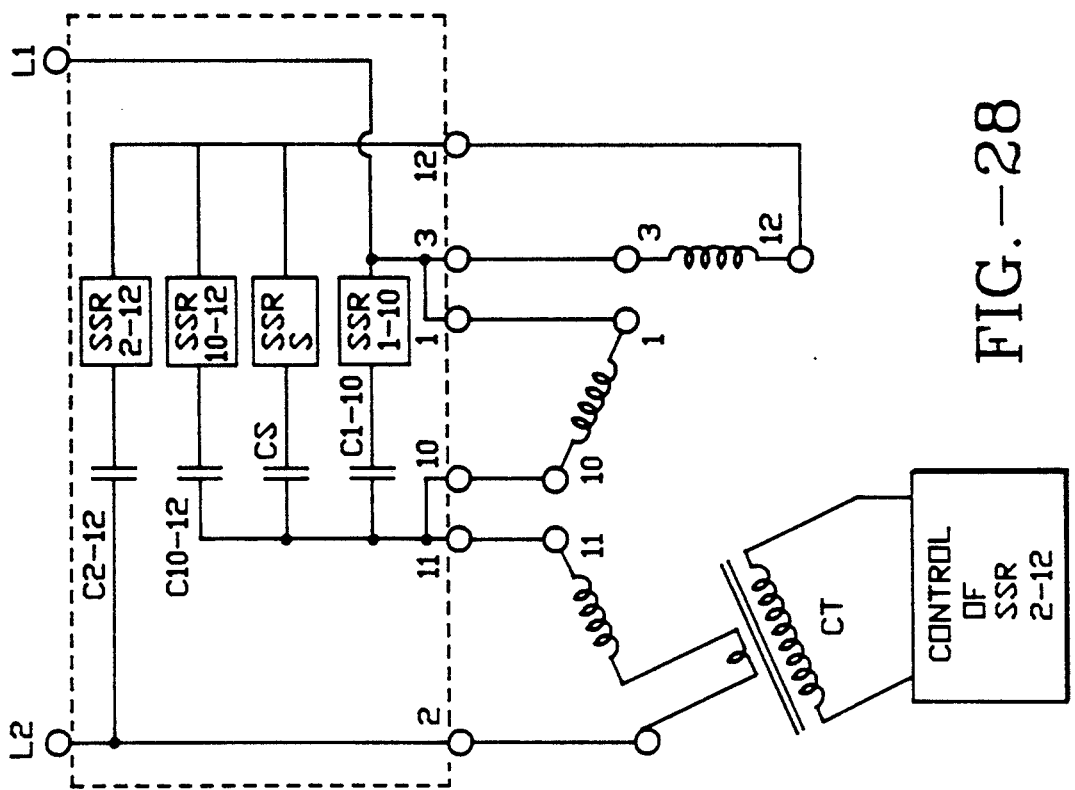
FIG.−28
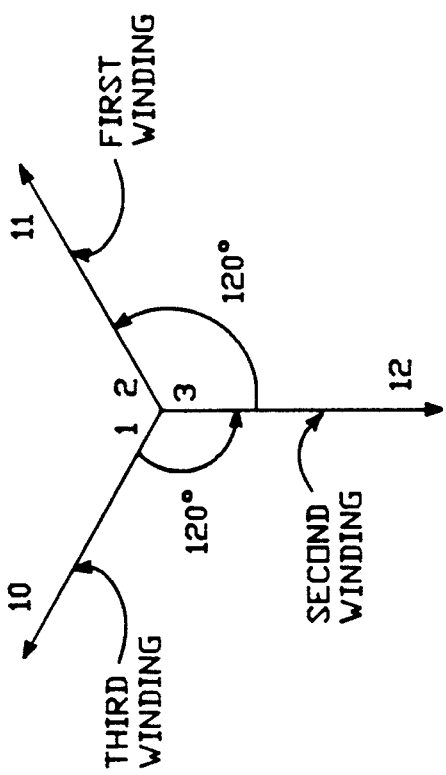
FIG.−26
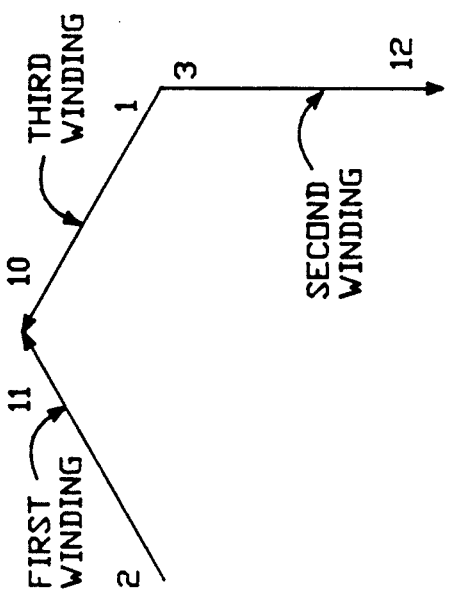
FIG.−27

5,300,870

THREE-PHASE MOTOR CONTROL

This is a continuation-in-part of application Ser. No. 07/593,795 filed Oct. 5, 1990 now abandoned.

BACKGROUND OF THE INVENTION

This present invention is directed to a three-phase induction motor which is operated from a single-phase power supply.

Three-phase induction motors have higher efficiency than single-phase induction motors of similar quality. In many locations, however, only single-phase power is available. A method of operating a three-phase motor from a single-phase supply is taught in U.S. Pat. No. 4,792,740, entitled "Three-Phase Induction Motor With Single Phase Power Supply", issued Dec. 20, 1988 to Otto J. M. Smith. This present invention is directed to an improved winding connection and an improved control system for switching the excitation capacitors in response to sensing the motor state.

OBJECTS AND SUMMARY OF THE INVENTION

It is a general object of the present invention to provide a three-phase induction motor which operates efficiently on a single-phase power supply.

It is another object of this invention to provide a feedback control circuit in conjunction with the three-phase induction motor to minimize the voltage or current imbalance for widely variable shaft loads.

It is another object of this invention to provide a new motor winding connection which is conveniently obtained from a standard twelve-terminal motor winding.

It is another object of this invention to provide a new motor winding connection which is suitable for dual-voltage and reversing uses.

It is another object of this invention to provide an improved method for sensing the motor state.

It is another object of this invention to provide a static phase converter which does not use a transformer.

It is another object of this invention to provide an improved circuit for reliable control of the solid-state relays used for capacitor switching.

It is another object of this invention to provide motor-state sensors not using current transformers.

In accordance with the above objects there is provided a method of using a two-wire single-phase power supply to excite a three-winding three-phase motor, each winding having first and second terminals with a common reference polarity across the first and second terminals wherein a first terminal of the first one of the windings is connected to the first wire of the said single-phase supply. A first terminal of the second one of said windings is connected to the second wire of the said supply. The second terminal of the said first winding is connected to the second terminal of the second winding. The first terminal of the third winding is also connected to the second wire of the power supply. The second terminal of the third winding is excited by a composite current generated by the sum of two different alternating currents with different phase angles.

BRIEF DESCRIPTION OF THE DRAWINGS

FIG. 4A is a diagrammatic representation of the motor windings connected to the power component box of the phase converter for a variable-load motor.

FIGS. 4B, 4C and 4D are alternative circuits illustrating FIG. 4A under three different load conditions.

FIG. 9 shows the voltage across one motor winding as a function of the control mode and operating state.

FIG. 12 is the mode-switching performance of the circuit in FIG. 11.

FIG. 13 is a circuit showing a portion of FIG. 5A.

FIG. 14 is a circuit which is an improvement of FIG. 13.

FIG. 17A shows the capacitors for a large lagging current angle. FIG. 17B shows the capacitors for a small lagging current angle.

FIG. 20 is a voltage phasor diagram for the windings in the circuit in FIG. 2A.

FIG. 21 is a voltage phasor diagram for the windings in FIG. 2A and FIG. 2B, showing the winding voltage phase relations, but not intended to show any constraint regarding the winding circuit interconnections.

FIG. 22 is the circuit connections for a delta configuration of the same windings as were used in FIG. 21. The connection between 2 and 12 is open as shown for an "unclosed" delta. An electrical connection is made between 2 and 12 for a "closed" delta.

FIG. 23 is the voltage phasor diagram for the delta circuit in FIG. 22.

FIG. 24 is the circuit diagram for a wye-connected three-phase motor for the lower voltage of a dual-voltage motor.

FIG. 25 is another voltage phasor diagram for the individual three windings in FIGS. 1 or 2A or 4 or 22 or 24 without a specification of the interconnection between the three windings.

FIG. 26 is another voltage phasor diagram for the individual three windings in FIG. 1 or 2A or 4 or 24 without a specification of the interconnection between the three windings.

FIG. 27 is a voltage phasor diagram derived from FIG. 26 for the interconnection specification of the circuit in FIG. 2B.

FIG. 28 is the circuit in FIG. 4 with a current transformer to sense and measure the current in winding 2-11 and control the solid-state relay 2-12 for the capacitor 2-12.

DESCRIPTION OF PREFERRED EMBODIMENTS

Figure 2A:
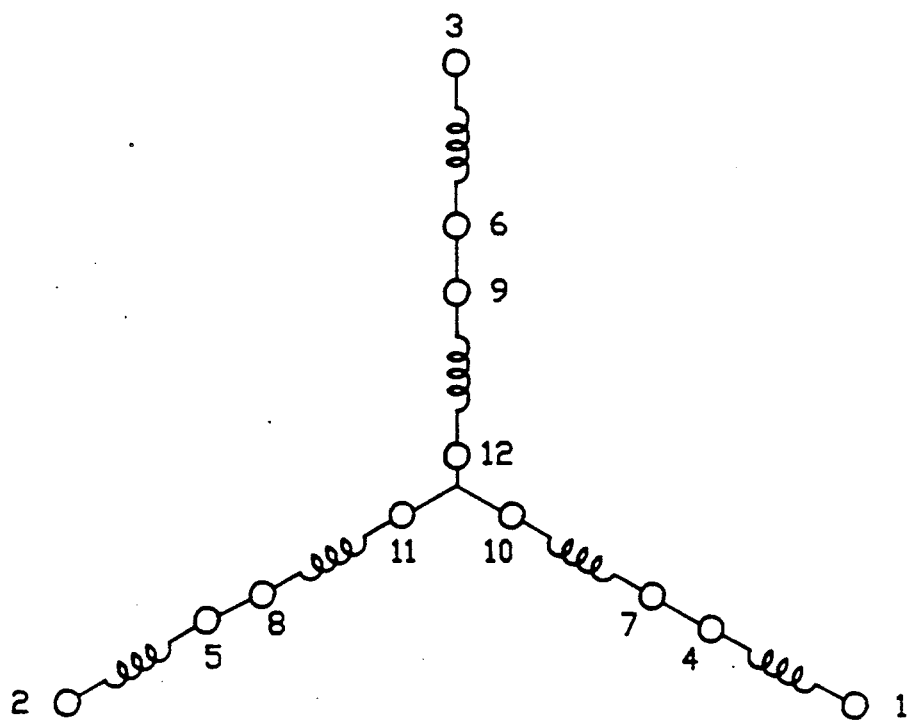
FIG. 2A is the motor terminal numbering convention adopted in this disclosure.

FIG. 2A shows a conventional dual-voltage six-winding three-phase induction motor connected for the higher voltage. Terminals 1, 2, and 3 are available for excitation from a three-phase supply. The winding between terminals 1 and 4, and the winding between terminals 7 and 10 are physically located in the motor stator so that they have the same phase of voltages. This is represented in the circuit diagram by drawing them with the same angle on the page. Similarly, the two windings between terminals 2 and 5, and between terminals 8 and 11, also have the same electrical voltage phase and are drawn with the same angle on the page. Similarly, the two windings between terminals 3 and 6, and between terminals 9 and 12, also have the same electrical voltage phase and are drawn with the same angle on the page. The terminals 10, 11, and 12 are connected together to form a "neutral" or the "center-tap" of the wye connection. For this higher-voltage connection, terminals 4 and 7 are connected together, terminals 5 and 8 are connected together. and terminals 6 and 9 are connected together. The phase of the voltage across the 2-11 circuit lags the phase of the voltage across the 1-10 circuit by 120 degrees. The phase of the voltage across the 3-12 circuit leads the phase of the voltage across the 1-10 circuit by 120 degrees.

Note that the phase of the voltage across the 3-12 winding lags the phase of the supply voltage between terminals 2 and 1 by 90 degrees. This relationship is important in simplifying the capacitor excitation circuits and is illustrated in FIG. 3B.

The motor in FIG. 2A can be reconnected for a supply voltage of one-half of that used for the higher voltage connection. For the lower voltage, the pairs of terminals that would be connected together are: 1 to 7, 4 to 10, 2 to 8, 5 to 11, 3 to 9, and 6 to 12. The power lines would still be connected to terminals 1, 2, and 3, and the center of the wye would still be the connection of terminals 10, 11, and 12.

Figure 2B:
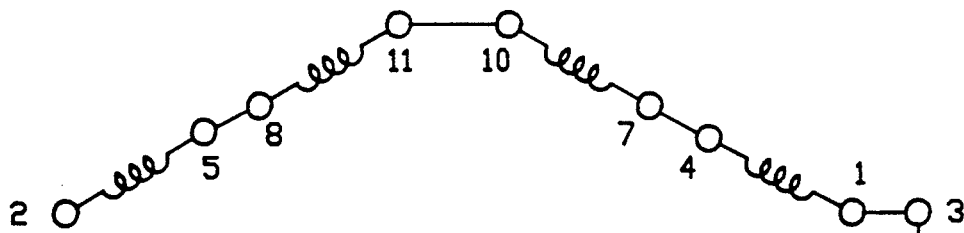
FIG. 2B is the motor winding connections used for the embodiment of FIG. 1.

FIG. 2B shows the preferred reconnection of the three-phase motor windings for this present invention. FIG. 2B is shown for the higher voltage. The pairs of terminals connected together are: 4 to 7, 5 to 8, 6 to 9, 1 to 3, and 10 to 11. The line-to-line power supply voltage will still be provided to terminals 1 and 2, but the power supply will not have the third phase available. Terminals 10 and 12 must be supplied from my "static phase converter" or from "manufactured" voltages, using the terminology of the patent previously referenced. Thus the winding 3-12 has been reconnected both in reverse polarity with respect to the three-phase connection of 12 to 10 and 11, and also 3 is connected to a different motor terminal, 1, and terminal 12 is the excited terminal, rather than terminal 3.

The preferred embodiment shown in FIG. 2B can easily be reconnected for a lower voltage. In this case, the terminal pairs connected together will be: 1 to 7, 4 to 10, 2 to 8, 5 to 11, 3 to 9, 6 to 12, 1 to 3, and 10 to 11. Again, the single-phase power supply will be connected to terminals 1 and 2, and terminals 10 and 12 must be supplied from a "static phase converter".

Figure 3A:
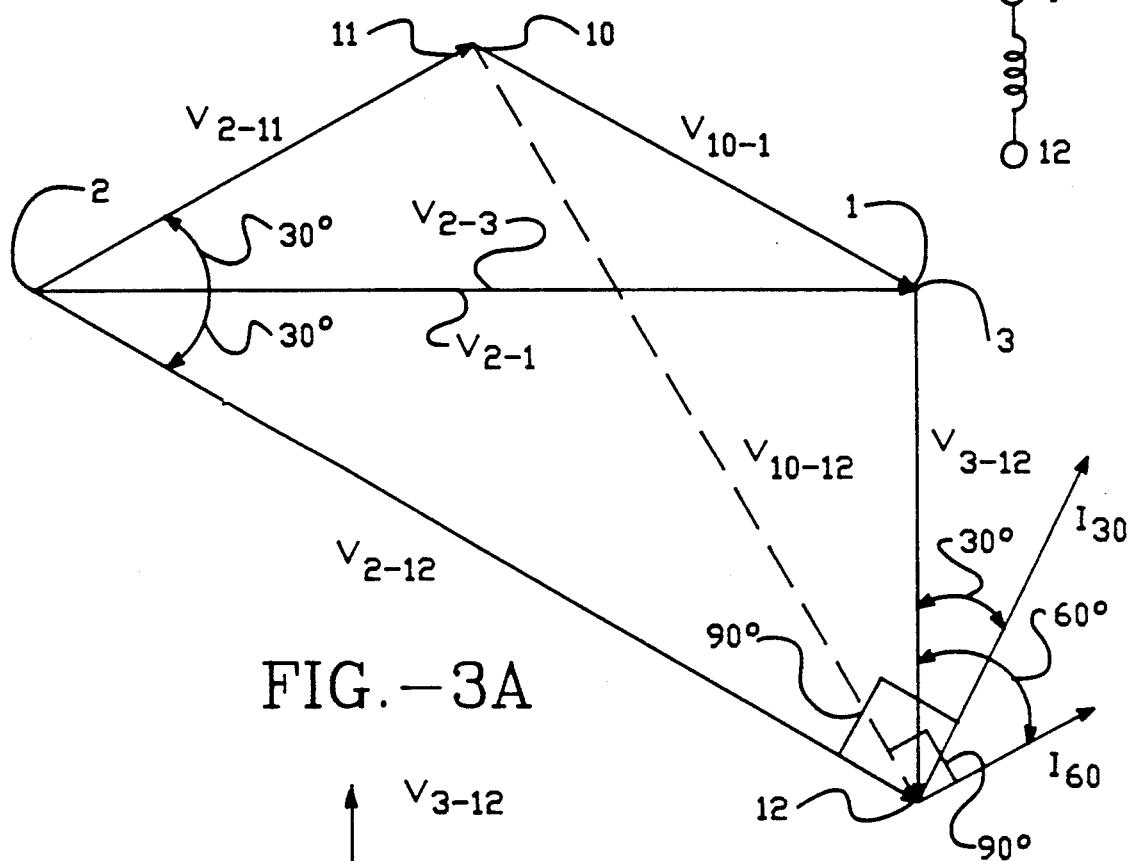
FIG. 3A is the voltage phasor diagram for FIG. 2B and FIG. 1.
Figure 3B:
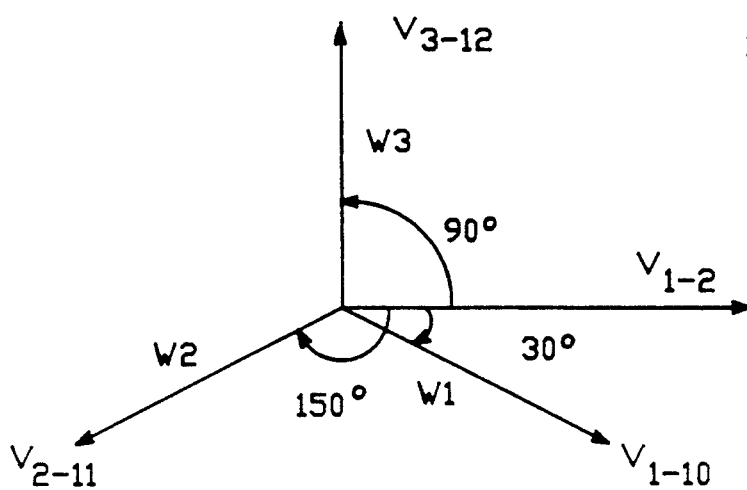
FIG. 3B is an alternate phasor diagram of FIG. 3A.

FIG. 3A shows the voltage phasor diagram for FIG. 2B, when the terminals are properly excited to produce balanced voltages in all of the windings. Voltage V2-1 has the phase of the power supply, which will be called the reference phase. Note again that the phase of the Voltage V3-12 lags the reference phase by 90 degrees. The phase of the voltage V10-1 lags the reference phase by 30 degrees. The phase of the voltage V2-12 also lags the reference phase by 30 degrees. The phase of the voltage V10-12 lags the reference phase by 60 degrees.

The phasor diagram of FIG. 3B shows the three winding (W1, W2, W3) voltages redrawn in standard 3-phase format and how they relate to the reference or line voltage with the reference phase and all of the phasors reversed with respect to FIG. 3A.

Figure 1:
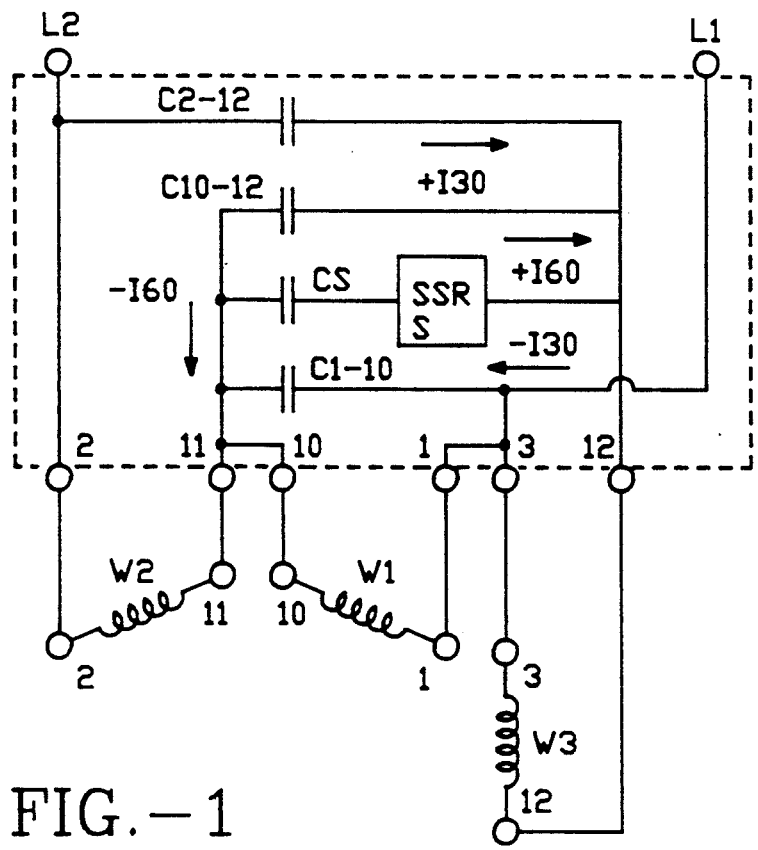
FIG. 1 is a circuit diagram of the motor windings connected to the power component box of the phase converter for a constant full load motor.

FIG. 1 shows the connection of the motor windings in FIG. 2B to the single-phase power supply and to the static phase converter. L1 and L2 are the single-phase power supply lines, connected respectively to terminals 1 and 2. The box marked SSR-S is a zero-crossing solid-state relay. The capacitors marked C are each one or more of a bank of capacitors.

The mode of operation of the static phase converter in FIG. 1 can be explained by considering first a specific shaft load, as for example, 90% of rated shaft power. Consider first a single capacitor C2-12. This is connected between terminals 2 and 12. When the capacitor can carry current, the capacitor current phasor will lead the voltage phasor V2-12 by 90 degrees. This current will lead the reference phase by 60 degrees. This current will be driven into the winding 12-3, and will lag the voltage V12-3 by 30 degrees under balanced conditions. I will call this current the 30-degree component.

Consider a single capacitor C10-12 connected between terminals 10 and 12. The phase of the voltage across this capacitor will lag the reference phase by 60 degrees. The phase of the current through this capacitor will lead its voltage by 90 degrees, so that the current phase will lead the reference by 30 degrees. This current will also be driven into the winding 12-3. This second current component will lag the winding voltage V12-3 by 60 degrees under balanced conditions. I will call this second current the 60-degree component.

The sum of the 30-degree component and the 60-degree component will be a first composite current with a phase angle dependent upon the relative magnitudes of the two components. The two current components have magnitudes chosen to make this first composite current have a magnitude and phase such that the winding currents are balanced in the three windings at the chosen 90% power level. In other words, this composite current has the same magnitude and phase angle that would occur in a motor connected to a standard three-phase power supply.

The capacitor C1-10 is connected between terminals 1 and 10. The current through this capacitor into the terminals 10 and 11 leads the voltage V1-10 by 90 degrees. The phase of this current is opposite to the phase of the previously mentioned said 30-degree component. The voltage 1-10 across this capacitor is one-half of the magnitude of the voltage V2-12. By using a capacitor C1-10 of capacitance magnitude double that of the said C2-12, then the current magnitude through C1-10 will be equal to that of the said 30-degree component. The two current components entering terminals 10 and 11 will then produce a second composite current equal in magnitude to the said first composite current, and with opposite phase angle. This is the condition for balanced currents and voltages in all of the windings, such that the motor operates as though it were connected to a balanced three-phase supply.

The preferred embodiment of this invention is FIG. 1 with the three constant capacitors chosen for near full load continuous duty operation on single phase with balanced voltages and currents in the three windings, with full load losses on single phase approximately equal to full load losses if the motor were operated on balanced three-phase. With fixed capacitors, the motor can operate between 75% load and full load with losses less than full-load losses.

Many two-pole induction motors have full load power factors near 86.6% due to full load winding currents which lag approximately 30 degrees. For these motors, capacitor C10-12 in FIG. 1 can be omitted. It is within the scope of this invention to use only two running capacitors, C1-10 and C2-12. The value of C10-12 would be zero.

It is within the scope of this invention to operate any induction motor near full load with only the two capacitors C1-10 and C2-12. In most cases, the currents in the windings will not be balanced. The capacitors will either provide adequate torque currents and inadequate magnetizing currents, or they will provide adequate magnetizing currents and excessive torque currents. In the first case, the voltage across winding 12-3 will be less than rated. In the second case, the currents in windings 2-11 and 10-1 will be less than rated. Because these latter two windings will carry currents necessary to compensate for the improper current in winding 12-3, the performance of the motor can be satisfactory at full load in either case, even though the currents are not balanced. Refrigerators and air compressors operate intermittently. The winding temperatures will be a function of the duty cycle, and the motors can be unbalanced while they are running. Therefore, only two running capacitors are needed.

Now referring back to the use of three capacitors, this balanced condition is for the specific shaft load chosen above of 90% of rated power. For a different shaft load, a different set of capacitor values should be used. For example, consider the changes necessary for a shaft load of 100% of rated power. The current into winding 12-3 must be larger for this higher power, and must have a higher power factor. In addition to the previously chosen capacitor C2-12, a second capacitor must be connected in parallel with the first capacitor, so that the new 30-degree component is higher, due to the currents through both of the capacitors.

In general, as the shaft load increases, the microfarad magnitude of the 30-degree component capacitors should increase, and the microfarad magnitude of the 60-degree component capacitors should decrease.

With discrete switching, the motor winding currents can be balanced at several preselected shaft load values. For shaft loads deviating from these preselected values, the winding currents and voltages will not be exactly balanced, but the performance can still be high efficiency with low losses.

The capacitor CS and associated SSR-S relay is the starting capacitor. It produces a 60-degree component current in the windings. The capacitor value can be chosen to produce a blocked-rotor current in winding 12-3 approximately equal to the three-phase blocked rotor winding current of the conventional motor connection on a conventional three-phase supply. The single-phase starting conditions will be similar to the conventional three-phase starting conditions.

With a capacitor CS which passes approximately five times rated winding current in the blocked-rotor (zero speed) condition, when the rotor is permitted to turn, the motor rotor will accelerate up to 80 percent of synchronous speed in approximately the same time that it would take a similar motor wye-connected to a three-phase supply to accelerate up to 80% of synchronous speed. The SSR-S relay should open up and disconnect the capacitor CS for all speeds above approximately 80 percent speed.

Different values of the capacitor CS will produce different values of starting current in the winding 12-3, and will produce different voltages across the winding 12-3, and will produce different starting accelerations. A small value of CS will produce a small acceleration, and the motor will take a long time to accelerate. A large value of CS will produce a large acceleration, and the motor will take a short time to accelerate. If the motor is driving a compressor, there can be a short time delay while the compressor is building up pressure and shaft torque due to the compression.

It is within the scope of this invention to select a capacitor CS and a corresponding acceleration time such that the acceleration time is comparable to the pressure build-up time in the shaft load. It is within the scope of this invention to select a capacitor CS and a corresponding acceleration time to minimize the deviation of the magnitude of the line current from a monotonic curve as it decreases from the large blocked-rotor initial starting current down to the full load motor running current without the capacitor CS.

I have provided a three-phase squirrel-cage induction motor having four motor terminals with a first motor phase winding connected between a first motor terminal and a second motor terminal, a second motor phase winding connected between said second terminal and a third motor terminal, a third motor phase winding connected between said third motor terminal and a fourth motor terminal, a two-wire single-phase power supply, means for connecting a first wire of the said power supply to said first motor terminal, means for connecting the second wire of the said power supply to said third motor terminal, said motor when running with a load having a loaded shaft speed less than a synchronous speed, starting means for connecting a starting capacitor between said second terminal and said fourth terminal, said starting means connecting the said capacitor when the motor shaft is stationary, and said starting means disconnecting the said capacitor before the motor shaft speed reaches 95 percent of said loaded shaft speed.

There are many motor applications where the load is constant near full load. It is within the scope of this invention to provide a circuit like FIG. 1 for a motor which operates at full load and for which only three fixed running capacitors are provided. Deep-well pumps and large ventilating fans are usually constant-load applications.

FIG. 1 is the preferred embodiment of this invention.

FIG. 4A shows the connection of the motor windings in FIG. 2B to a single-phase power supply and to my static phase converter for a variable-load application. L1 and L2 are the single-phase power supply lines, connected respectively to terminals L1 and L2. The boxes marked SSR are each either a continuous connection or one or more zero-crossing solid-state relays. The capacitors marked C are each a generic representation of one or more of a bank of capacitors. Each capacitor of each bank will have either its own associated solid-state relay or a direct connection through the SSR box. The single-line drawing in FIG. 4A of a series circuit of a capacitor and an SSR box is a generic representation of a set of several series circuits, all connected in parallel.

The mode of operation of the static phase converter in FIG. 4A can be explained by considering first a specific shaft load, as for example, 75% of rated shaft power. Consider first also a single capacitor C2-12. This capacitor has in series with it a single solid-state relay box SSR-2-12. This series circuit is connected between terminals 2 and 12. When the solid-state relay is closed, and the capacitor can carry current, the capacitor current phasor will lead the voltage phasor V2-12 by 90 degrees. This current will lead the reference phase by 60 degrees. This current will be driven into the winding 12-3, and will lag the voltage V12-3 by 30 degrees. I will call this current the 30-degree component.

Consider a single capacitor C10-12 connected between terminals 10 and 12. The phase of the voltage across this capacitor will lag the reference phase by 60 degrees. The phase of the current through this capacitor will lead its voltage by 90 degrees, so that the current phase will lead the reference by 30 degrees. This current will be driven into the winding 12-3. This current component will lag the winding voltage V12-3 by 60 degrees. I will call this current the 60-degree component. The sum of the 30-degree component and the 60-degree component will be a first composite current with a phase angle dependent upon the relative magnitudes of the two components. The two current components have magnitudes chosen to make this first composite current have a magnitude and phase such that the winding currents are balanced in the three windings.

The capacitor C1-lo and its associated solid state relay box SSR-1-10 is connected between terminals 1 and 10. The current through this capacitor into the terminals 10 and 11 leads the voltage V1-10 by 90 degrees. The phase of this current is opposite to the phase of the previously mentioned said 30-degree component. The voltage 1-10 across this capacitor is one-half of the magnitude of the voltage V2-12. By using a capacitor C1-10 of capacitance magnitude double that of the said C2-12, then the current magnitude through C1-10 will be equal to that of the said 30-degree component. The two current components entering terminals 10 and 11 will then produce a second composite current equal in magnitude to the said first composite current, and with opposite phase angle. This is the condition for balanced currents and voltages in all of the windings, such that the motor operates as though it were connected to a balanced three-phase supply.

This balanced condition is for the specific shaft load chosen above of 75% of rated power. For a different shaft load, a different set of capacitor values should be used. For example, consider the changes necessary for a shaft load of 100% of rated power. The current into winding 12-3 must be larger for this higher power, and must have a higher power factor. In addition to the previously chosen capacitor C2-12, a second capacitor and a second solid-state relay must be connected in parallel with the first capacitor, so that the new 30-degree component is higher, due to the currents through both of the capacitors. In FIG. 4A, the SSR-2-12 box represents a bank of relays which can be controlled by the motor state, to connect and disconnect various combinations of the capacitors in a bank represented generically by the symbol C2-12 in the FIG. 4A.

In general, as the shaft load increases, the microfarad magnitude of the 30-degree component capacitors should increase, and the microfarad magnitude of the 60-degree component capacitors should decrease.

With discrete switching, the motor winding currents can be balanced at several preselected shaft load values. For shaft loads deviating from these preselected values, the winding currents and voltages will not be exactly balanced, but the performance can still be high efficiency with low losses.

Where a motor will always operate at a known load, less than three capacitors may be efficient. For example, in FIG. 4B, two windings in series are placed across the single-phase supply. A third phase winding has a capacitor C1 in series, and the series combination is placed across the single-phase supply. A second capacitor C2 is connected from the center tap between the first two phase windings to that supply line which is not connected to a capacitor. This is appropriate for a motor with lagging phase angle near 30 degrees for full load.

In FIG. 4C, two windings in series are placed across the single-phase supply. A third capacitor C3 is connected in series with the third phase winding, and the series combination is connected from the center tap between the first two windings and one terminal of the single-phase supply. This is appropriate for low load or no load for a motor with lagging phase angle near 60 degrees at low load.

Finally, FIG. 4D (equivalent to FIG. 1) shows the complete circuit for any specified load. Two windings in series are placed across the single-phase supply. A third phase winding has a capacitor C1 in series, and the series combination is placed across the single-phase supply. A second capacitor C2 is connected from the center tap between the first two phase windings and one line of the single-phase supply which is not connected to capacitor C1. An additional capacitor is connected between the center tap of the two series phase windings and the center tap between capacitor C1 and the third phase winding.

Figure 5:
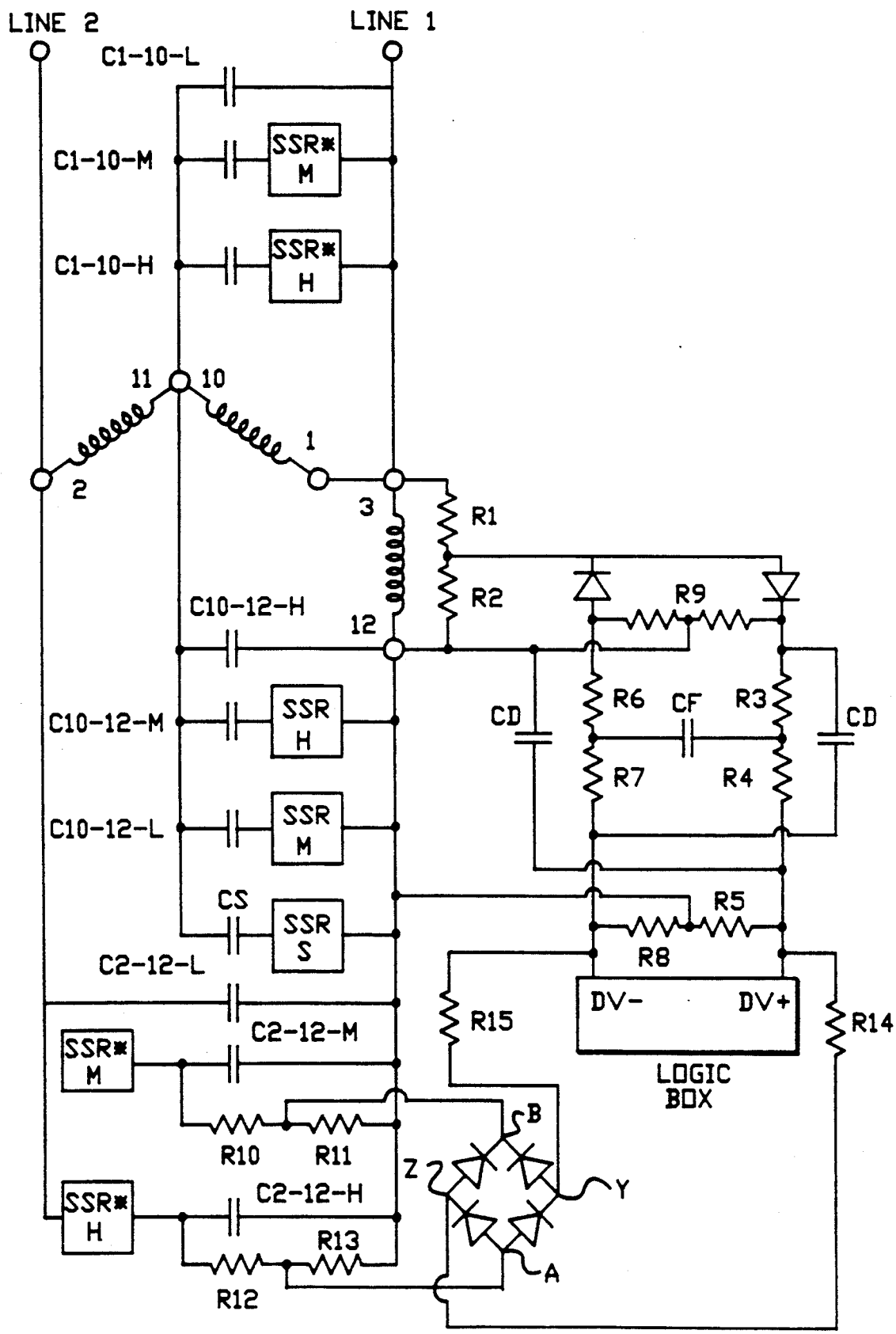
FIG. 5 is a more detailed circuit for FIG. 4A showing also the sensing of the motor state.

FIG. 5 shows the wiring diagram for a three-mode single-phase motor control. The winding terminals are the same as in FIGS. 1 and 4. The mode designations are "L" for Low power or Light load, "M" for Medium power or Moderate load, and "H" for High power or Heavy load. At light load, in the "L" mode, capacitor C2-12-L is connected between terminals 2 and 12, and capacitor C1-10-L is connected between terminals 1 and 10. These are both 30-degree capacitors, and produce 30-degree lagging currents in the windings. In the "L" mode, two of the solid-state relays are conducting. These are SSR-H and SSR-M. Connected between terminals 10 and 12 are three capacitors in parallel: C10-12-H, C10-12-M, and C10-12-L. All three of these capacitors are carrying 60-degree current into winding 12-3. The composite current into winding 12-3 can be lagging, for example, 54 degrees with a winding power factor of 58%; or the composite current could be, for example, lagging 60 degrees with a winding power factor of 50% if the 30-degree currents were all zero. All of the boxes or relays with SSR* are non-conducting in this mode. The starting switch SSR-S is also non-conducting.

At moderate loads, in the "M" mode, both solid state relays SSR*M will be conducting. These will connect the additional capacitors C1-10-M and C2-12-M, each in parallel with C1-10-L and C2-12-L respectively, so that four capacitors are delivering 30-degree currents. In the M mode, relay SSR-M is non-conducting. This removes capacitor C10-12-L. The 60-degree component current is therefore less in Mode M than it was in mode L. In mode M, only capacitors C10-12-H and C10-12-M are conducting 60-degree currents. The composite current in winding 12-3 can have, for example, a lagging phase angle of 43.8 degrees and a winding power factor of 72.1%; or the composite current could have, for example, a lagging phase angle of 44.4 degrees and a winding power factor of 71.4%. Relays SSR*H will be non-conducting and SSR-H will be conducting.

At heavy shaft loads or full power, in mode H, all SSR* relays are conducting, and both SSR-H and SSR-M are non-conducting. All C2-12 capacitors and all C1-10 capacitors are delivering 30-degree currents, and only the one C10-12-H capacitor is delivering a 60-degree current. Both SSR-H and SSR-M are non-conducting. The composite current in winding 12-3 can be, for example, lagging 36.6 degrees with a winding power factor of 80.3%. This means the injected current conforms perfectly to the expected power factor of the winding current since COS 36.6° = 0.803. The motor in this mode H will have balanced voltages and currents at a preselected shaft power value, which could be, for example, 99% of rated power.

The starting solid-state-relay designated SSR-S is shown in FIGS. 1 and 5. The control for this relay can be responsive to the sensed current in either a winding or in the supply line. The control can be a timer to disconnect the solid-state-relay after a preselected time. The control can be responsive to the shaft speed to disconnect the solid-state-relay when the shaft speed exceeds a preselected value, for example, 80 percent of synchronous speed. The control can be responsive to the sensed voltage on the driven leg such that the solid-state-relay is disconnected when the sensed voltage exceeds a preselected value.

FIG. 3A shows the voltage phasor diagram for FIG. 5. Also shown are two current phasors $I_{30}$ and $I_{60}$ which have the phase angles of the two current components that are driven into winding 12-3. A proper weighting of these two current phasors can reproduce any current phase angle needed between 30 degrees and 60 degrees. The current components are $I_{30} = 2I \sin(60-\theta)$ and $I_{60} = 2I \sin(\theta - 30)$ where I is the total current, and $\theta$ is the lag angle of the current after the winding voltage.

(In the unlikely event that a mode is chosen for very light load near no load and that the current must be balanced at this light load with a lagging phase angle greater than 60 degrees, then an $I_{90}$ current component can be created with a capacitor connected directly across winding 3-12. An unsymmetrical wye connected capacitor circuit with the three terminals of the wye at 2, 1, and 10 is needed to excite terminals 10 and 11 in this case.)

Figure 17A:
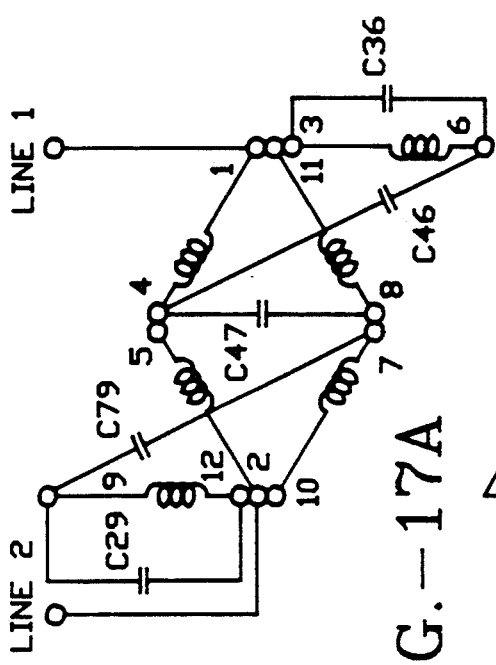
FIGS. 17A and 17B show alternative winding connections for FIG. 1.

If a small multi-pole motor requires balanced currents at a lagging phase angle greater than 60 degrees in the windings, the circuit in FIG. 17A may be used. In this circuit, capacitors C46 and C79 provide currents lagging 60 degrees into windings 6-3 and 9-12 respectively. They also provide the same 60-degree currents into the nodes 4-5 and 7-8 respectively which are necessary to satisfy Kirchoff's laws. The capacitors C36 and C29 provide 90-degree lagging current components into windings 6-3 and 9-12 respectively. The sums of these components can be specified to equal the desired winding currents at the specified lagging phase angle greater than 60 degrees. The capacitor C47 provides the necessary 90-degree current component into both the 4-5 node and the 7-8 node to satisfy Kirchoff's laws.

Figure 17B:
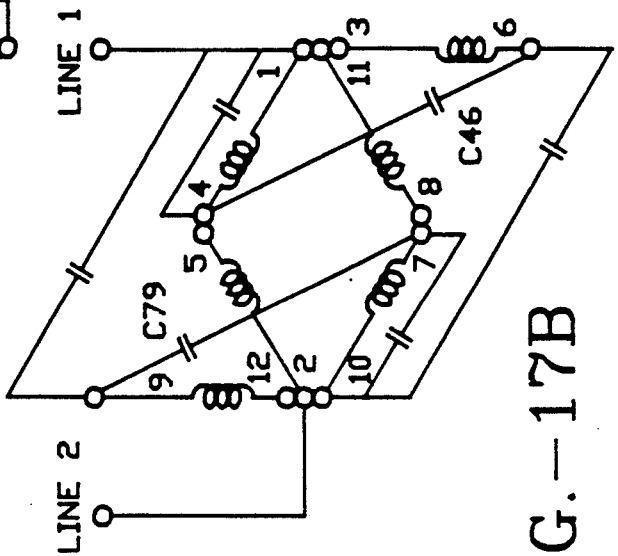

With the winding circuit shown in FIG. 17A, the capacitor connections to provide winding currents with lagging phase angles less than 60 degrees is shown in FIG. 17B.

SENSORS

There are two aspects of the motor state that are sensed for control purposes. One aspect is a measure of the shaft power, and the other aspect is a measure of the circuit state.

A signal related to the shaft power is the voltage across winding 12-3. The resistance of resistor R2 in FIG. 5 is very much less than that of resistor R1, so that the series connection is a potentiometer sampling the voltage across winding 12-3. The voltage across R2 with respect to reference terminal 12 is rectified by two diodes and the rectified voltage appears across the center-tapped load resistor R9 which center-tap is connected to terminal 12. The positive rectified voltage is passed through resistors R3 and R4 to the Logic box terminal marked DV+, which stands for "Decision Voltage+". I shall use the notation that DV+ and DV− are terminals on the input to the Logic box or Logic circuit in FIG. 5. I shall use the notation that DV is the Decision Voltage drop from terminal DV+ to terminal DV−. DV+ is loaded by resistor R5 which is connected from DV+ to the reference terminal 12. The negative rectified voltage from R2 is passed through resistors R6 and R7 to the Logic box terminal marked DV−, which stands for "Decision Voltage−". DV− is loaded with resistor R8 which is connected from DV− to the reference terminal 12. For symmetry in resistor magnitudes, R3=R6, R4=R7, R5=R8, and R9 is center-tapped.

The capacitor CF connected between the positive and negative voltages performs two functions. One function is to smooth out the ripple in the rectified voltage waves. A second function is to time-delay the signal from the rectified voltage across R2 so that the Decision Voltage signal to the Logic box receives this power sensing signal delayed in time, and not instantaneously.

I will call the winding 12-3 the "driven-leg". The driven-leg voltage across winding 12-3 varies with shaft power. As the shaft power increases above the preselected value for balanced motor conditions, the said driven-leg winding voltage decreases. As the shaft power decreases below the preselected value for balanced motor conditions, the said driven-leg winding voltage increases. This causes the Decision Voltage DV to vary approximately inversely with respect to the shaft power.

The circuit state of the relays and the capacitor voltages is another one of these aspects needed for control. In FIG. 5, resistors R10 and R11 are connected in series across capacitor C2-12-M. The connection between R10 and R11 is the terminal B. In the L mode, this capacitor is disconnected, and there will be no voltage across R10 and R11. In the M mode and the H mode, this capacitor has alternating-current voltage across it, and these resistors will have a voltage across them. These resistors form a voltage divider or potentiometer, in which R10 is very much larger than R11, and in which the voltage across R11 is very much less than the voltage across R10. The voltage across R11 is connected to the B terminal of two diodes, so that the positive signal with respect to terminal 12 is passed through a diode to terminal Y and causes a current to flow through resistor R15 to the Logic box terminal marked DV−, and the negative signal on R11 is passed through a different diode to terminal Z and causes a negative current to flow through resistor R14 to the Logic box terminal marked DV+.

These circuit-state current components to the Decision Voltage are in the opposite direction to the current components from the driven-leg voltage, i.e., they reduce the magnitude of the Decision Voltage DV.

Only in the H mode will there be voltage across capacitor C2-12-H. This voltage is sampled by the voltage divider or potentiometer of resistors R12 and R13. The low-voltage tap between these resistors is connected to terminal A. Voltage across R13 between A and reference terminal 12 means that the circuit is in mode H. This voltage is supplied to terminal A and rectified by the two diodes connected to terminal A. The positive rectified voltage appears at terminal Y and causes a current to flow through resistor R15 to the DV− terminal of the Logic box. Similarly, the negative voltage at A with respect to reference terminal 12 is conducted through a diode to terminal Z, and causes a negative current to flow through R14 to the terminal marked DV+ of the Logic box.

The net effect of all of these currents is that the Logic box inputs marked DV+ and DV− have a "Decision Voltage" difference DV which decreases monotonically with increasing shaft load, and in addition the voltage DV decreases discontinuously when the circuit mode shifts from the L mode to the M mode, and again, decreases discontinuously when the circuit mode shifts from the M mode to the H mode.

Figure 6:
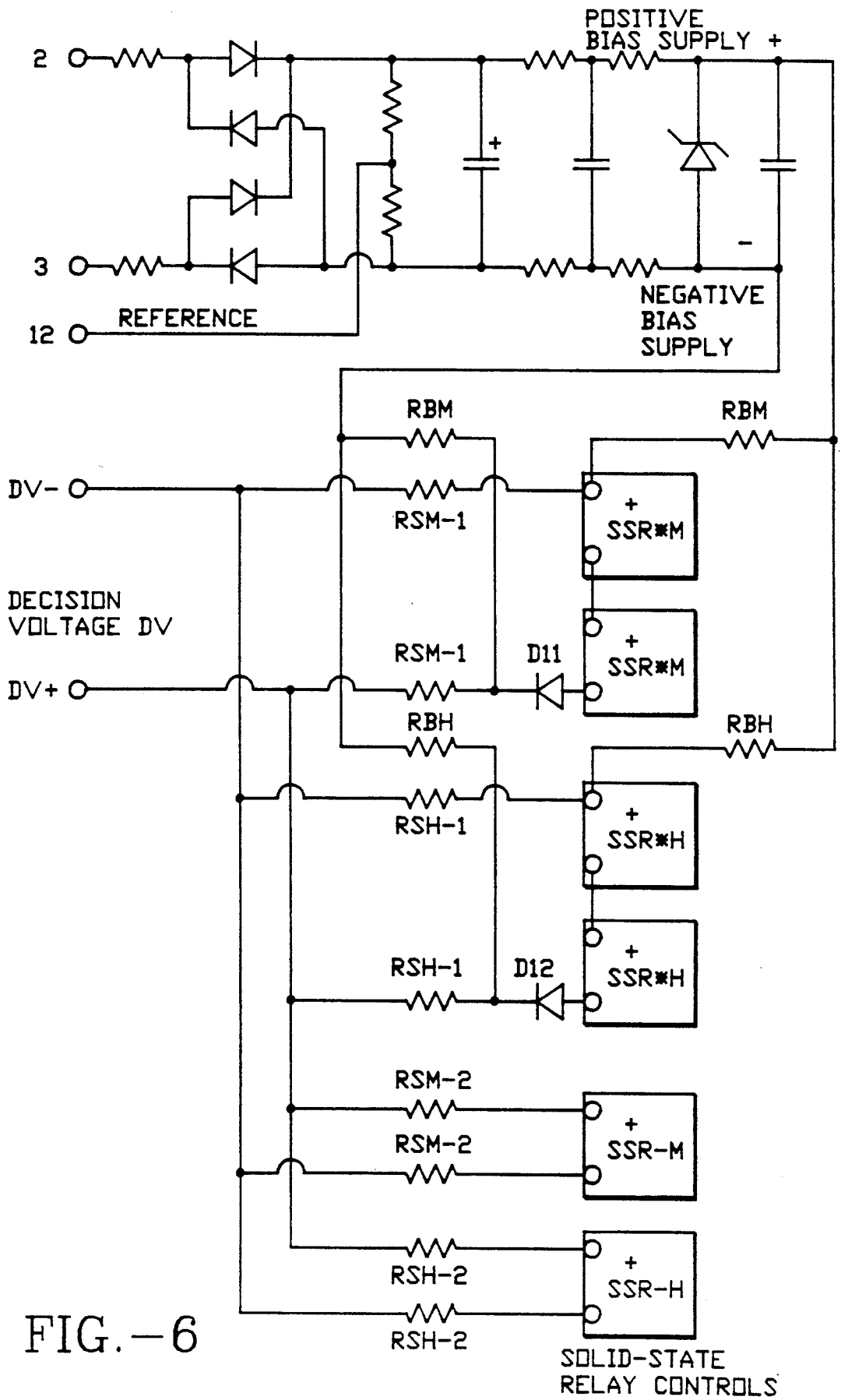
FIG. 6 is the circuit for the solid-state relay controls for FIG. 5.

FIG. 6 is the circuit which links the Logic box in FIG. 5 to the solid-state relays in FIG. 5. In FIG. 6, a bias supply is obtained by rectifying a portion of the voltage from terminals 2 to 12, and by rectifying twice as great a portion of the voltage from terminals 3 to 12. (The voltage across the driven-leg winding is nominally only 57.7%, and the voltage from 2 to 12 is nominally 115.5%.) The rectified voltage is filtered in a conventional manner, and is stabilized by a Zener diode in a conventional manner. The bias supply is connected to the control inputs of the SSR*M relays through two resistors marked RBM, carrying current in the direction to actuate the relays. The bias supply is connected to the control inputs of the SSR*H relays through two resistors marked RBH, carrying current in the direction to actuate the relays. Relays SSR-M and SSR-H do not have any input bias current.

A portion of the Decision Voltage DV from FIG. 5 is provided to all of the solid state relays through adjusting resistors from the terminals DV+ and DV− to the relay control inputs. Resistors RSM-1 carry current from the Decision Voltage into the inputs of relays SSR*M in the opposite direction to the bias current. These two oppositely directed currents partially cancel each other at low shaft power and low motor input power and high Decision Voltage, so that the relays SSR*M are not actuated. When the shaft power increases and the Decision Voltage decreases, the bias current becomes dominant", and at a first preselected value of shaft power or motor input power, the bias current is sufficient to cause the relays to actuate.

Resistors RSH-1 carry current from the Decision Voltage into the inputs of relays SSR*H in the opposite direction to the bias current. These two oppositely directed currents partially cancel each other at medium shaft power and medium motor input power and at lower Decision Voltage values than in the previous paragraph, so that the relays SSR*H are not actuated. When the shaft power increases further and the Decision Voltage decreases, the bias current becomes dominant, and at a higher second preselected value of shaft power or motor input power, the bias current is sufficient to cause the relays to actuate.

The input to relay SSR-M is driven directly from the Decision Voltage through two resistors RSM-2. This relay is actuated at low input powers with high values of the Decision Voltage. When the input power increases and the Decision Voltage decreases, at the said first preselected value of power, relay SSR-M will be deactivated.

The input to relay SSR-H is driven directly from the Decision Voltage through two resistors RSH-2. This relay is actuated at both low and medium input powers with high values of the Decision Voltage. When the input power increases and the Decision Voltage decreases, at the said second preselected value of power, relay SSR-H will be deactivated. The values of the resistances are chosen to produce the relay actuations at the preselected values of powers.

Figure 7:
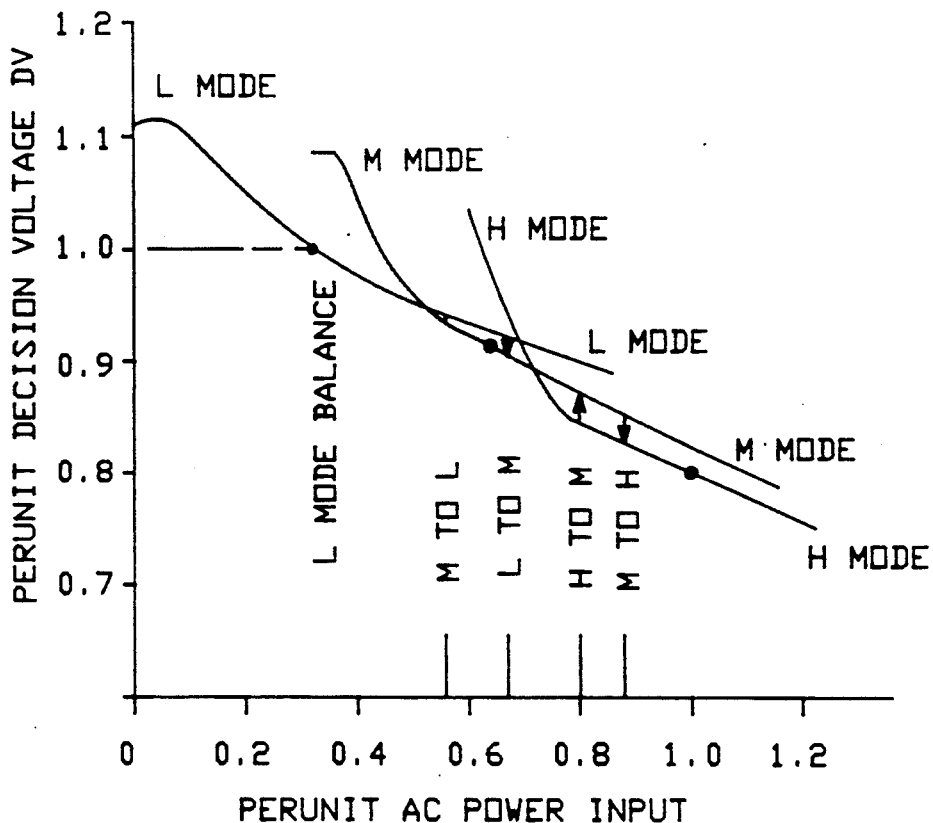
FIG. 7 shows the performance of the system in FIG. 5 for one adjustment of the controls.

FIG. 7 shows the per unit Decision Voltage DV generated by the circuit in FIG. 5 as a function of the AC single-phase power input. Table I shows the percent susceptance of the capacitances in FIG. 5 for the particular example in FIG. 7. 100 percent susceptance is defined as rated winding current divided by rated line-to-line voltage.

TABLE I

| Capacitor | Percent Susceptance |
| --- | --- |
| C2-12-L | 0. |
| C2-12-M | 33.5 |
| C2-12-H | 35.1 |
| C1-10-L | 0. |
| C1-10-M | 67.0 |
| C1-10-H | 70.2 |
| C10-12-H | 22.8 |
| C10-12-M | 12.9 |
| C10-12-L | 19.0 |

With these capacitor values, the three mode balance states are given in Table II.

TABLE II

| MODE | L | M | H |
|---|---|---|---|
| Kilowatts electric input | 34% | 64% | 99% |
| Current | 54.7% | 72.1% | 99.1% |
| Power factor, windings | 50.0% | 71.4% | 80.3% |
| 1 lag angle, degrees | 60.0 | 44.4 | 36.6 |

With this particular circuit, in the L mode, the Decision Voltage DV versus AC power input is given in FIG. 7. One per unit Decision Voltage DV is the value at the L mode balance point of 34% power input. At less than this balance power, the Decision Voltage DV is greater than one per unit. At more than this balance power, the Decision Voltage DV is less than one per unit.

At the balance point in the M mode, at 64% input, DV is 0.92 per unit, and the M mode curve is below the L mode curve. The resistors in FIG. 6 are chosen so that the relay circuits switch the capacitors from the M mode to the L mode when DV increases above 0.94 due to the input diminishing below 58%. The resistors in FIG. 6 are chosen so that the relay circuits switch the capacitors from the L mode to the M mode when DV decreases below 0.93 due to the input increasing above 66%.

At the balance point in the H mode, the input is 99% and DV is 0.8 per unit. The H mode curve lies below the M mode curve in FIG. 7. In the M mode, when the input increases above 88%, DV decreases below 0.85 per unit, and the circuit switches to the H mode. In the H mode, when the input diminishes below 80%, DV increases to above 0.855, and the circuit switches to the M mode. L mode operation can occur for any input power between 0% and 66%. M mode operation can occur for any input power between 58% and 88%. H mode operation can occur for any input power above 80%. The hysteresis band or "overlap" was chosen as an 8% power change to provide reliable switching without dither or oscillations.

The circuit in FIG. 5 contains a positive feedback loop from resistors R10 and R11 to the Logic box. When DV is decreasing, and causes a switch from the L mode to the M mode, the voltage on B increases, and this rectified voltage through R14 and R15 reduces DV even further, "locking" the circuit into the new M mode and preventing a return to the L mode. The circuit-state sensor from R12 and R13 also is positive feedback, which is very desirable.

The power sensor from resistor R2 into the DV voltage is negative feedback for low frequencies. When the power input increases and DV decreases and the circuit switches from L mode to M mode, additional capacitances are connected across the windings, resonating the windings, and causing the winding voltages to increase discontinuously. If this effect were immediately presented to Dv again, then DV would increase and the circuit might switch back to the L mode, starting an oscillation and switching back and forth continuously. This is undesirable. It is advantageous to delay this negative feedback signal with the capacitor CF, which reduces the inherent resonant frequency of this negative feedback loop. In addition, capacitors CD are provided such that the high-frequency transfer function of the sensor is reversed in phase with respect to the low-frequency transfer function. The high-frequency components of the signal across R6 are transmitted directly by one of the CD capacitors to DV+. The high-frequency components of the signal across R3 are transmitted directly by another one of the CD capacitors to DV−.

This "cross-coupling" changes the high-frequency feedback from negative feedback to positive feedback. The capacitors CD cause the DV voltage to initially decrease when switching suddenly from the L mode to the M mode. This is positive feedback and "locks" the logic into the new mode. Eventually, when the capacitors CD discharge their transient voltages and charge up to their steady-state voltages, DV will return to one of the steady-state curves in FIG. 7. The capacitors CD are essential to provide reliable single-action switching for all possible sudden shaft torque changes.

In FIG. 6, diodes D11 and D12 are provided in series with the inputs to SSR*M and SSR*H. In the event of a severe voltage transient at low load on the motor, DV might increase sufficiently to attempt to reverse the current into the control inputs to these relays. These diodes limit the current to only the normal direction of flow through the relay control input.

In FIG. 6, the relays are very sensitive, but they do not have exactly the same actuating currents. When the current through the two SSR*M relays reaches the actuating value, only one of the pair of relays will respond. Because of the positive feedback mechanism described above, the current due to DV will change suddenly further in the same direction as it was changing as it reached the actuating value. This drives the other relay in the pair to also actuate. Also, this positive feedback mechanism will drive relay SSR-M to change in the correct manner. It is desirable to adjust the resistors so that each relay has exactly the same response characteristic, but this is not essential. When any one relay responds to a signal, the other relays that were supposed to respond simultaneously to the same signal will be driven to respond properly within one cycle due to the positive feedback circuit described previously.

Figure 8:
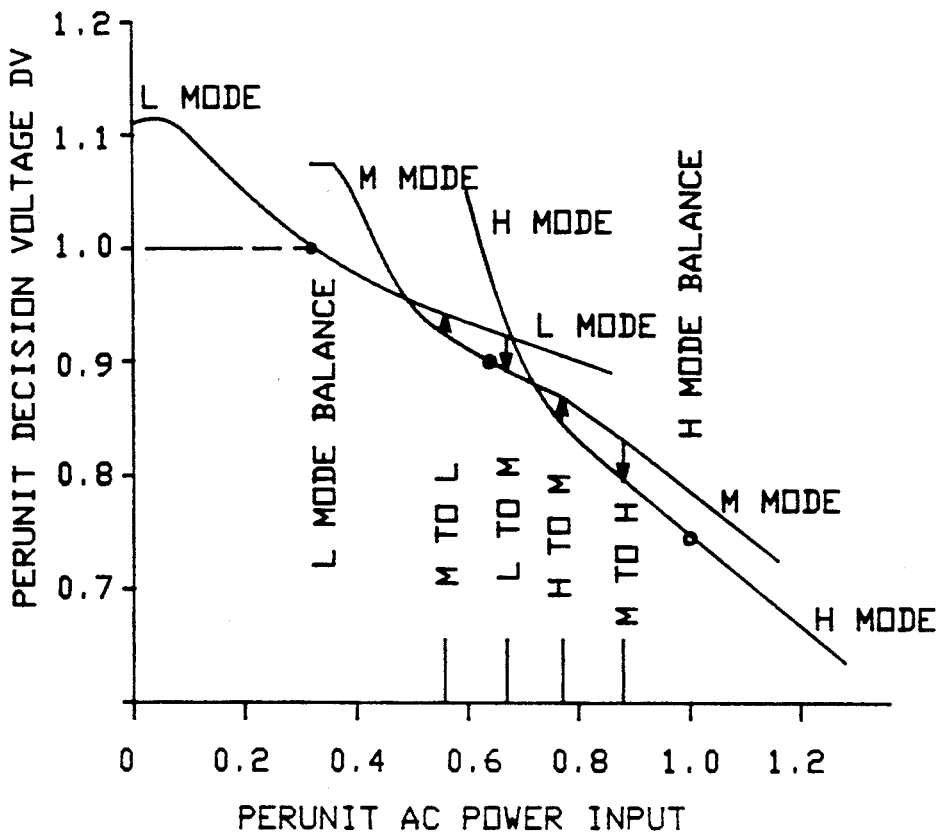
FIG. 8 shows the performance of the system in FIG. 5 for a different adjustment of the controls.

The relative weighting of the resistors R1, R2, R10, R11, R12 and R13 in FIG. 5 determine the shape and level of the DV curves in FIG. 7. An increase in R11 will cause the M curve to move down. An increase in R13 will cause the H curve to move down. FIG. 8 shows a different set of Decision Voltage curves produced by increasing both R11 and R13. In FIG. 8, switching from the L mode to the M mode occurs above 70% input power at a DV of 0.92 per unit. Switching from M mode to L mode occurs below 56% input power at a DV of 0.93 per unit. The hysteresis band is 13% power change. Switching from M mode to H mode occurs above 88% input power at a DV of 0.83 per unit, and switching from H mode to M mode occurs below 78% input power at a DV of 0.84 per unit. The hysteresis band is 10% power change.

These circuits provide the flexibility to adjust the desired power ranges for each mode, to adjust the power levels at which switching occurs, and to adjust the hysteresis bands.

The driven-leg voltage alone is shown in FIG. 9 as a function of the ac input power. The L mode curve in FIG. 9 is the same as the L mode curves in FIGS. 7 and 8. The M mode curve of driven-leg voltage in FIG. 9 shows the balance point at 64% input power. The Decision Voltage DV uses not only this M curve, but also includes a signal from the circuit capacitor which moves the M mode curve in FIG. 9 down by 0.08 per unit for FIG. 7, and down by 0.1 per unit for FIG. 8. The H mode curve of driven-leg voltage in FIG. 9 shows a balance at 99% input power. The Decision Voltage DV uses not only this H curve, but also includes a signal from the circuit capacitors which moves the H mode curve down by 0.2 per unit in FIG. 7, and down by 0.24 per unit in FIG. 8.

It is within the scope of this invention to omit capacitor C10-12-L and the series connected SSR-M in FIG. 5. This capacitor would have been used only in the L mode. At the L-mode power producing balanced currents, according to Table 1, this capacitor would have provided 19.0% susceptance and 19% current at 60-degrees lagging into winding 12-3. When capacitor C10-12-L is used, in the L mode, at the L mode balance power, 54.7 percent current at 60-degrees lagging is driven into winding 12-3.

When capacitor C10-12-L is omitted, only approximately 35.7 percent current at approximately 60 degrees lagging is driven into winding 12-3 at the same shaft power as in the previous sentence. This winding 12-3 is therefore "underexcited" in the L mode. Node 10 and node 11 also do not receive the amount of 60-degree lagging current that they would have received under balanced conditions. The motor will therefore operate unbalanced over the entire range of the L mode. The motor will have partial excitation from capacitors C10-12-H and C10-12-M. The windings will be able to provide the torque necessary for the shaft loads in the L mode.

It is well known to engineers skilled in the art, that if winding 12-3 is completely disconnected, and that if all capacitors are removed, that the two remaining windings, 2-11 and 10-1, will be able to provide torque sufficient for half shaft power. This condition I will call a "stripped-down" circuit.

I am providing in addition to the "stripped-down" circuit, the third winding 3-12, and partial excitation for this third winding and partial excitation for the intermediate nodes 10 and 11 with the capacitors C10-12-H and C10-12-M. My motor with this circuit will operate with higher efficiency than the "stripped-down" circuit.

To repeat, capacitor C10-12-L may be omitted.

In summary, I have provided a three-phase motor with four motor terminals connected to the motor windings, a two-wire single-phase power supply, means to connect a first wire of the said power supply to a first said motor terminal, means to connect a second wire of the said power supply to a second said motor terminal, means to connect a first capacitor between said first motor terminal and a third motor terminal, means to connect a second capacitor between said second motor terminal and a fourth motor terminal, and means to connect a third capacitor between said third motor terminal and said fourth motor terminal.

In addition, I have provided first solid-state relay means for the said means to connect a first capacitor, second solid-state relay means for the said means to connect a second capacitor, and third solid-state relay means for the said means to connect a third capacitor.

In addition, I have provided first sensing means for sensing the voltage between said first motor terminal and said fourth motor terminal, and means to control said first solid-state relay responsive to said voltage.

In addition, I have provided means to control said second and said third solid-state relays responsive to said voltage.

In addition, I have provided means responsive to the rate of change of said voltage to control said first solid-state relay.

In addition, I have provided means responsive to the capacitor voltage across the said second capacitor to control said first solid-state relay.

Figure 10:
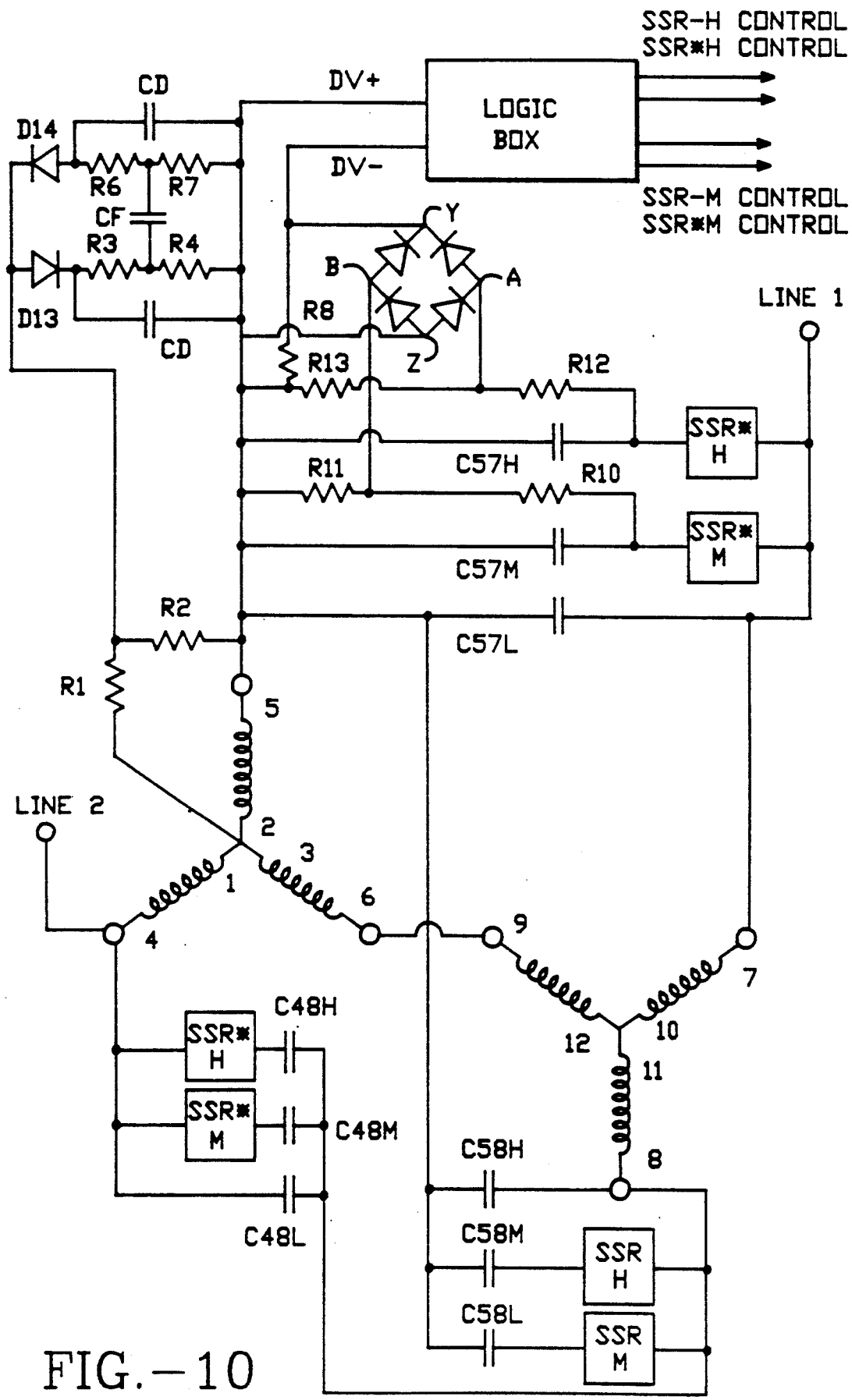
FIG. 10 is the circuit for an alternate motor winding connection and the associated phase converter and motor state sensor.

FIG. 10 shows the application of this present invention to a different connection of the motor windings. Using the notation shown in FIG. 2, terminals 1, 2, and 3 are connected together. Terminals 10, 11, and 12 are connected together. Terminals 6 and 9 are connected together. Terminal 7 is connected to the single-phase Line 1 and terminal 4 is connected to the single-phase Line 2. Terminals 8 and 5 have to be driven by the static phase converter. The winding connection in FIG. 10 is like the winding connection in FIG. 1 of U.S. Pat. No. 4,792,740. The capacitors in my FIG. 10 are like the capacitors in FIG. 1 of this said patent. This present FIG. 10 includes state and circuit sensors.

Capacitor C48L provides a 30-degree lagging component of current into winding 8-11 in the L mode. Capacitor C57L provides a 30-degree lagging component of current into winding 5-2 in the L mode. Capacitors C58H, C58M, and C58L all provide a 60-degree lagging component of current into winding 8-11. With the capacitor magnitudes as taught in the said patent, the motor can operate at balanced voltages and currents in all of the windings at a preselected power value in the L mode. All of the SSR* relays are non-conducting. Both SSR-H and SSR-M are conducting.

Similarly, in the M mode, relays SSR*M are conducting, relay SSR-M is non-conducting, SSR-H is conducting and both SSR*H relays are non-conducting. Capacitors C48L and C48M provide the 30-degree lagging current component into winding 8-11. Capacitors C58M and C58H provide the 60-degree lagging current component into winding 8-11. With the capacitor values taught in the said patent, the motor can operate with balanced voltages and balanced currents in the M mode at a preselected value of power. Similarly, in the H mode, relays SSR*H and SSR*M are conducting, and SSR-H and SSR-M are non-conducting. With the capacitor values taught in the said patent, the motor can operate with balanced voltages and currents in the H mode at a preselected value of power.

In FIG. 10, the voltage across winding 2-5 is sampled by the potentiometer R1 and R2. The voltage across R2 is rectified by two diodes D13, D14. The positive voltage passes a current through R3 and R4 into the circuit terminal marked DV+. The negative voltage across R2 passes a negative current through R6 and R7 into the circuit terminal marked DV−. The capacitor CF is provided to filter the ripple and to delay the passage of the high frequency components of the rectified signal to DV+ and DV−. The CD capacitors are cross-coupled as in FIG. 5 so that the high frequency changes in the voltage across R3 are delivered to DV−, and the high frequency changes in the voltage across R6 are delivered to DV+. This circuit is positive feedback for high frequencies, and negative feedback for low frequencies.

In FIG. 10, the circuit state is sensed by measuring the voltage across capacitor C57M with the potentiometer R10 and R11. The voltage across R11 with respect to the reference terminal 5 is delivered to terminal B. When it is positive, it delivers a positive current to Y and to DV−. When the voltage across R11 is negative, it delivers a negative current to Z and to DV+. These currents are delivered only when the circuit is in mode M or mode H.

In mode H only, the capacitor C57H has voltage across it. This voltage is sensed by the potentiometer R12 and R13. The voltage across R13 with respect to the reference terminal 5 is delivered to terminal A, and delivers a positive current to Y and to DV−. The negative voltage across R13 delivers a negative current to Z and to DV+. The sum of all of these currents produces a Decision Voltage difference DV between DV+ and DV− which is the same as that shown in FIG. 7. FIG. 10 can use the same logic circuit as shown in FIG. 6.

The voltage from 4 to 8 in FIG. 10 is 86.6%. The voltage from 2 to 12 in FIG. 5 was 115.5%. The capacitors connected from 4 to 8 in FIG. 10 must therefore have 4/3 of the microfarad values that they had in FIG. 5. In capacitor microfarad values, C48L = 1.33 × C2-12-L. C48M = 1.33 × C2-12-M. C48H = 1.33 × C2-12-H. Because of symmetry, C57L = C48L. C57M = C48M. C57H = C48H.

The 60-degree components are unchanged. In microfarads: C58H = C10-12-H. C58M = C10-12-M. C58L = C10-12-L.

In summary, I have provided a three-phase motor with five external terminals, a two-wire single-phase power supply, means to connect one wire of the said power supply to a first motor terminal, means to connect the other wire of the said power supply to a second motor terminal, means to connect a first capacitor between said first terminal and a third motor terminal, means to connect a second capacitor between said second terminal and a fourth motor terminal, means to connect a third capacitor between said third terminal and said fourth terminal, a controllable switch in series with said first capacitor, means to sense the magnitude of the voltage between said third terminal and a fifth motor terminal, and means responsive to said magnitude to control said switch.

In addition, I have provided means responsive to the rate of change of said magnitude to control said switch.

In addition, I have provided means to sense the capacitor voltage across the said first capacitor, and means to control said switch responsive to said capacitor voltage.

Figure 11:
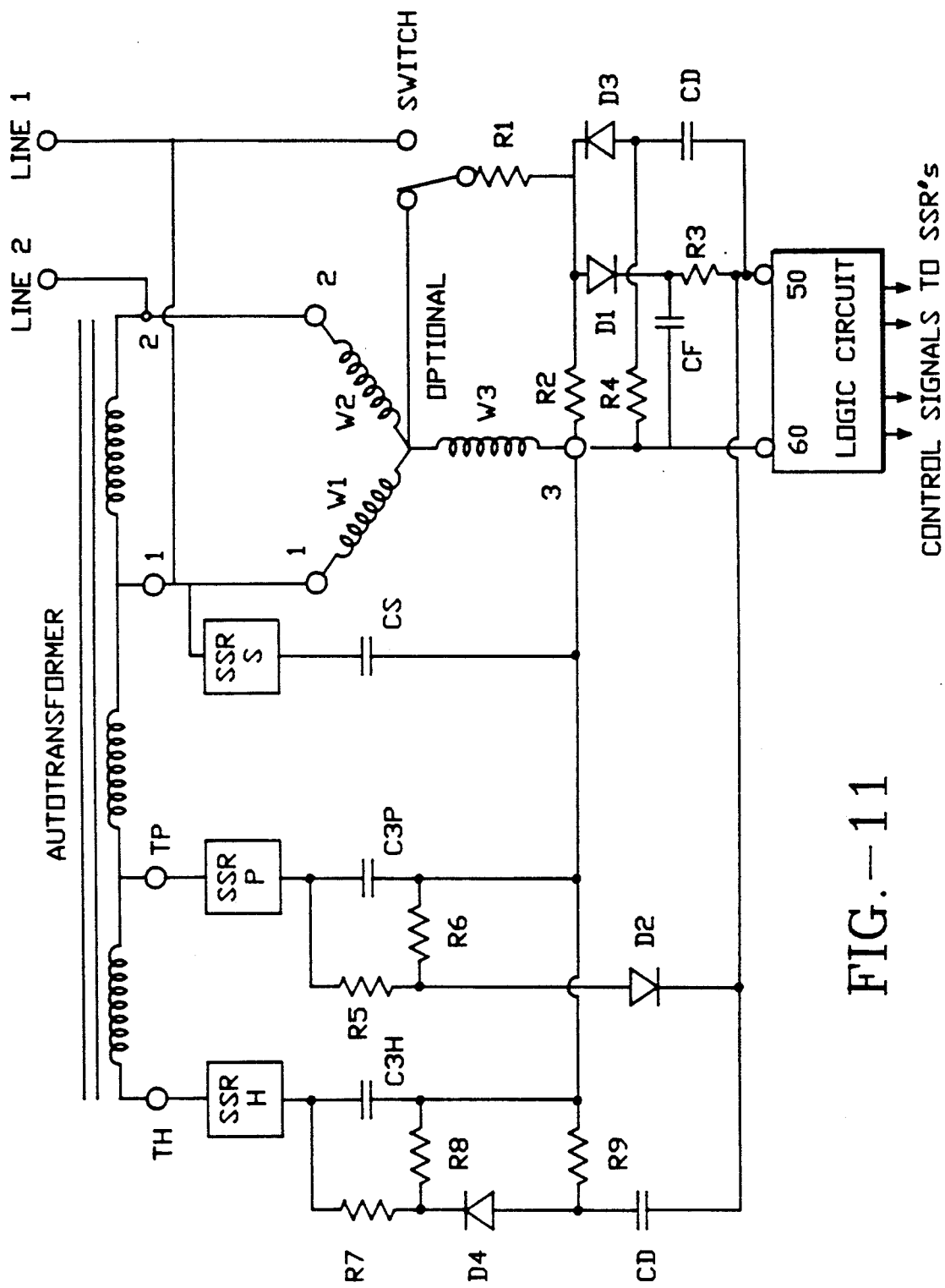
FIG. 11 is the application of the control method of this invention to a three-terminal motor.

FIG. 11 is an application of this invention to a three-terminal three-phase motor, or to a four-terminal three-phase motor. The additional terminals as shown in FIG. 2 are not available. In FIG. 11, the single-phase line, Line 1, is connected to motor terminal 1. The single-phase line Line 2 is connected to motor terminal 2. Motor terminal 3 must have "manufactured" current, or be supplied by a static phase converter.

An autotransformer is provided with voltage taps designated 1, 2, TP and TH. Tap 1 is connected to motor terminal 1. Tap 2 is connected to motor terminal 2. This circuit is designed for two modes of control. The H mode is for High power, and uses the tap TH. The P mode is for Partial power, and uses the tap TP. SSR-H connected to TH is closed only for the H mode. SSR-P connected to TP is closed only for the P mode.

Connected to autotransformer tap TH is one power terminal of the solid-state relay SSR-H. Capacitor C3H is connected in series between the other power terminal and motor terminal 3. When the power contacts of SSR-H are closed for the H mode, the voltage between terminal TH and motor terminal 3 is impressed across the capacitor C3H, and causes a capacitor current to flow from TH to motor terminal 3. This capacitor current leads the voltage from TH to 3. This capacitor current in winding W3 lags the voltage drop in winding W3 from the terminal 3 to the center of the wye by exactly the same angle as the voltage from TH to 3 lags the voltage from TH to tap 1 or tap 2. The phase angle of the preselected H mode balance point can be matched by the selection of the voltage at tap TH. The magnitude of the preselected H mode balance current can be produced by the selection of the microfarad capacity of C3H.

For example, for an H mode balance current angle of 36.7 degrees lagging at 99% power, the TH tap to terminal 1 voltage should be 66.3%. Algebraically, $V_{(TH-1)} = -0.5 + 0.866/\tan 36.7°$. The voltage from TH to 3 is 145%. For a balance current of 994, the susceptance of C3H should be 68.3%. These calculations are neglecting the approximately one volt drop across the contacts of the solid state relay. The effect of this voltage drop is different for different rated motor voltages, and is least important for high-voltage motors.

Connected to autotransformer tap TP is one power terminal of the solid-state relay SSR-P. Capacitor C3P is connected in series between the other power terminal and motor terminal 3. When the power contacts of SSR-P are closed for the P mode, the voltage between terminal TP and motor terminal 3 is impressed across the capacitor C3P, and causes a capacitor current to flow from TP to motor terminal 3. This capacitor current leads the voltage from TP to 3. This capacitor current in winding W3 lags the voltage drop in winding W3 from the terminal 3 to the center of the wye by exactly the same angle as the voltage from TP to 3 lags the voltage from TP to tap 1 or tap 2. The phase angle of the preselected P mode balance point can be matched by the selection of the voltage at tap TP. The magnitude of the preselected P mode balance current can be produced by the selection of the microfarad capacity of C3P.

For example, for a P mode balance current angle of 50.5 degrees, power factor of 63.6%, at a P mode balance power of 50%, the voltage from TP to terminal 1 should be 21.4%. The voltage from tap TP to terminal 3 is 112.2%. For a P mode balance current of 63.3%, the capacitor C3P should have a susceptance of 56.4%. This is neglecting the voltage drop across the relay contacts.

In FIG. 11, a wye center-tap connection is provided to the switch whose movable contact is connected to resistor R1. The series connection of R1 and R2 has the voltage across winding 3 impressed on it, so that the voltage across R2 is a small portion of the winding voltage. When this voltage is positive, it is rectified by Diode D1 and a positive current passed through resistor R3 to terminal 50 of the Logic circuit. In the steady state in the H mode, this is the only input to the Logic circuit. The decision voltage produced at this state is called 100 percent at the H mode balance point. This voltage rises with a reduction in shaft load, and this voltage decreases with an increase in load.

Capacitor CF connected from diode D1 cathode to reference terminal 3 of the motor smooths out the ripple of the rectified voltage and also provides a time-delay between changes in the winding voltage and changes in the input to the Logic circuit.

This circuit produces a low-frequency negative-feedback component to the feedback control loop. This also provides the control signal which is inversely proportional to the motor input power. In FIG. 11, the negative voltage across R2 is rectified by the diode D3, which passes a negative current through resistor R4 back to the reference terminal 3. This negative voltage across R4 responds rapidly to changes in the winding voltage. These negative voltages are passed immediately through capacitor CD to terminal 50 of the Logic circuit. The signals through diode D3 are high-frequency positive feedback, and are necessary to provide reliable single-action switching for rapid shaft load changes of any type. The signals through D3 are responsible for causing a mode change to lock into the new mode and not oscillate between two different modes.

In FIG. 11, the voltage across capacitor C3H, which occurs only in the H mode, is sensed by the resistors R7 and R8 in series, so that the voltage across R8 is a portion of the capacitor voltage. Negative voltages across R8 with respect to terminal 3 are rectified by diode D4 and impressed across resistor R9. Sudden changes in this voltage are passed immediately through another capacitor CD to terminal 50. This is another high-frequency positive-feedback loop for stabilization.

In FIG. 11, the voltage across capacitor C3P, which occurs only in the P mode, is sensed by the resistors R5 and R6 in series. The voltage across R6 is a small portion of the capacitor voltage. When the voltage across R6 is positive, it is rectified by diode D2 and contributes a positive current into terminal 50 of the Logic circuit. The magnitude of this positive current is determined by the selection of the value of resistor R6. This positive current increases the decision voltage curve by 19%, so that at the P mode balance point the decision voltage is up to 119%. The P mode decision voltage curve lies above the H mode curve in the region in which mode switching occurs.

FIG. 12 shows the Decision Voltage generated by the Logic circuit in FIG. 11. The H mode curve is the per unit voltage at terminal 3 when operating in the H mode. This is also the per unit Decision Voltage DV since there is no other steady-state input to DV in the H mode. There is shown a per unit driven-leg voltage in the P mode which is the voltage at terminal three. This curve is one per unit at the balance power of 50%. In the P mode, an extra 19% signal is added to DV from the capacitor voltage. The P mode DV curve is therefore higher in FIG. 12 by 19%. Using the two DV curves for control, switching from P to H occurs at 88% power, and switching from H to P occurs at 72% power. The hysteresis band in this case is 16% power.

For the circuit in FIG. 11 and the curves in FIG. 12, the logic table for the control of the solid-state relays is given in Table III.

TABLE III

| AC POWER PER-CENT | MODE | DECISION VOLTAGE % BEFORE ACTION | ACTION | DECISION VOLTAGE % AFTER ACTION |
|---|---|---|---|---|
| 30 | P | 130 | NONE | |
| 50 | P | 119 | BALANCE | |
| 72 | P | 113.5 | NONE | |
| 72 | Power H | 112 | H to P | 113.5 |
| 88 | Power < P | 109.5 | P to H | 105 |
| 88 | Power H | 105 | NONE | |
| 99 | Power < H | 100 | BALANCE | |

Note:
Power means power increasing.
Power < means power decreasing.
H to P means turn off SSR-H and turn on SSR-P.
P to H means turn off SSR-P and turn on SSR-H.

In the more-likely event that the center-tap of the wye motor windings is not brought out, then an alternate connection for sensing the motor winding voltages is shown by the switch in FIG. 11. When this switch is moved to the right, resistor R1 is supplied current from terminal 1 of the motor. Because voltage from 1 to 3 is 1.732 times the voltage from center-tap to 3, the new R1' ohms should be larger than the old R1 ohms. In ohm values: R1' = 1.732 R1 + 0.732 R2.

(Terminal 2 can not be used for this purpose, because the winding voltage change as a function of load is much different in the three different windings.)

Capacitor CS in FIG. 11 is the starting capacitor. It can have a susceptance of about 500%. It delivers a blocked-rotor current into winding W3 which lags the voltage by about 60 degrees, and produces a blocked-rotor torque which is comparable to the three-phase motor blocked-rotor torque when supplied from a balanced three-phase power supply. Using a smaller value of capacitance CS will produce a slow, low-torque start. Using a much larger value of capacitance for CS will produce a very rapid high torque start, with torques that can exceed the manufacturer's design torque value. Solid-state starting relay SSR-S can be either time controlled, or controlled in the conventional manner from winding current. In the latter case, the relay should close for currents greater than 300%, and should open for currents less than 200%. SSR-S must be open for all normal loads.

In summary, a three-phase motor with two terminals connected to the two lines of a single-phase supply can have the third motor terminal excited by a first series combination of a first capacitor, a first solid-state relay, and a first winding of an autotransformer, and can have the third motor terminal also excited by a second series combination of a second capacitor, a second solid-state relay, and a second winding of an autotransformer.

I have provided a three-phase motor with three terminals, a single-phase power supply with two terminals, and an autotransformer with two input terminals and two additional output terminals, two of the three motor terminals are connected to the two terminals respectively of the said power supply, the two input terminals of the said autotransformer are connected to the two terminals respectively of the said power supply, a first capacitor connected in series between the third of the said motor terminals and one power contact of a first controllable switch, the other power contact of said first controllable switch connected to the first of the said additional output terminals, a second capacitor connected in series between the third of the said motor terminals and one power contact of a second controllable switch, the other power contact of said second controllable switch connected to the second of the said additional output terminals, and means to control the said switches so that when said first switch is closed, said second switch is open, and so that when said first switch is open, said second switch is closed.

I have provided in addition, means to sense the voltage between the third of the said motor terminals and one of the other motor terminals, and means to control said first switch responsive to said sensing means.

I have provided in addition, means to sense the rate of change of the voltage between the third of the said motor terminals and one of the other motor terminals, and means to control said first switch responsive to said rate of change.

I have provided a three-phase motor including means to sense the state of the voltage across said first capacitor, and means to control said first switch responsive to said state.

I have provided in addition, means to sense the rate of change of the voltage across said first capacitor, and means to control said first switch responsive to said sense means.

The circuit in FIG. 5 has six solid-state-relays for switching between modes H, M and L. The SSR-H relay can be removed in a slightly different capacitor circuit, keeping the same performance. A portion of the old FIG. 5 is shown in FIG. 13. Shown in this FIG. 13 are the two lines connected to nodes 1 and 2, an SSR*H relay with the power circuit connected from node 1 to the C1-10-H capacitor. The other terminal of this capacitor is connected to node 10. Node 10 is also connected to capacitor C10-12-M, the other terminal of this capacitor connected to solid-state-relay SSR-H, the other power terminal of this relay being connected to node 12. Node 12 is also connected to capacitor C1-12-H, the other terminal of this capacitor connected to one power terminal of solid-state-relay SSR*H, and the other power terminal of this relay connected to node 2, and to LINE 2. It can be seen that this portion of FIG. 5 shown in FIG. 13 performs as follows: When SSR*H relays are unenergized and SSR-H relay is energized, the capacitor C10-12-M is connected between nodes 10 and 12 for modes L and M. The C1-10-H and C2-12-H do not conduct current. In mode H, SSR*H relays are energized and connect the capacitors C1-10-H and C2-12-H to conduct current. Relay SSR-H is unenergized and disconnects capacitor C10-12-M.

An improvement on the circuit in FIG. 13 is shown in FIG. 14. The branch between nodes 10 and 12 with the series circuit of SSR-H and C10-12-M has been removed. Terminal 57 is the connection between C1-10-H and its SSR*H. Terminal 58 is the connection between C2-12-H and its SSR*H. Between terminals 57 and 58 is connected a new capacitor $C_{60}$-M. In the H mode, capacitors C1-10-H and C1-12-H conduct current as before. The new capacitor $C_{60}$-M is connected directly across the public utility power line and contributes to leading current in the supply lines.

In the M and L modes, with both SSR*H relays open, there is a new series circuit between nodes 10 and 12, consisting of the series connection of the three capacitors C1-10-H, $C_{60}$-M, and C2-12-H. This new series circuit has an equivalent capacity exactly equal to the capacity of C10-12-M in FIG. 13. The performance is therefore identical to that of FIG. 5.

The susceptance values of C2-12-H and C1-10-H for the example in Table I are 34.6 and 69.1 percent respectively. The C10-12-M value that must be duplicated by three capacitors in series is 13.1 percent. This makes the new value of $C_{60}$-M equal to 30.3 percent susceptance.

The motor volt-amperes, based on rated winding current and line-to-line voltage, is VA=1.732 at full load, and 1.716 per unit at the H mode balance. The motor reactive (lagging) VARS at H balance is 1.023 lagging per unit. The motor power input at H balance is 1.376 per unit.

The capacitor leading VARS are 1.590 in FIG. 5 and FIG. 13. In FIG. 14, $C_{60}$-M adds an extra 0.303 making a total of 1.893 VARS leading. The net VARS leading on the single-phase line is 0.870 per unit. The net power factor on the single-phase line is 84.5% and the net VA is 1.628 per unit. The net current on the single-phase line is 94.1% leading by 32.3 degrees.

This is a useful power-factor improvement and current reduction and simultaneously saves the cost of one solid-state relay. The method in FIG. 14 is useful when C1-10-H and C2-12-H are large, and C10-12-M and $C_{60}$-M are proportionally small.

In summary, I have provided a four-terminal three-phase motor, with a first contact of a first controllable contactor connected to a first motor terminal, a first contact of a second controllable contactor connected to a second motor terminal, a first capacitor connected between a third motor terminal and a second contact of said first controllable contactor, a second capacitor connected between a fourth motor terminal and a second contact of said second controllable contactor, and a third capacitor connected between said second contact of said first controllable contactor and said second contact of said second controllable contactor, such that when both contactors have open contacts, the said three capacitors are connected in series between said third motor terminal and said fourth motor terminal.

Figure 15:
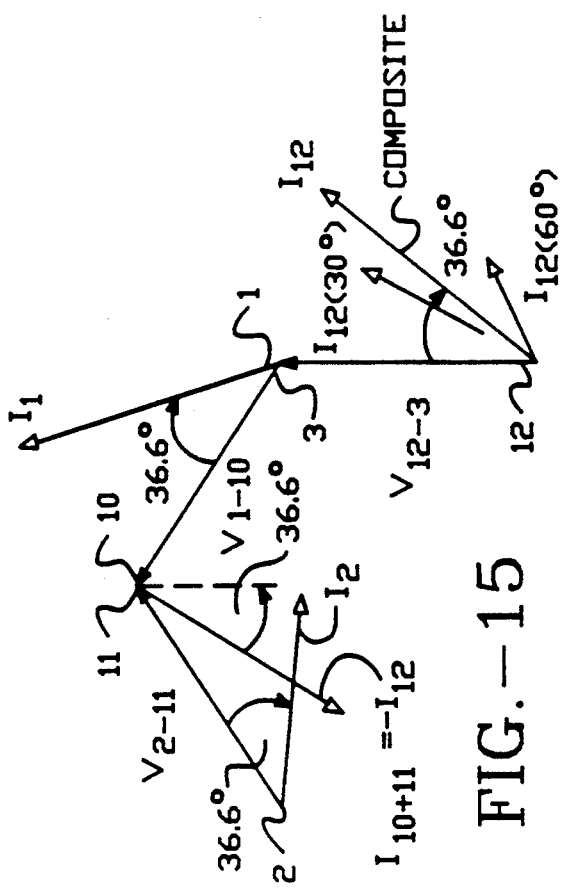
FIG. 15 is a phasor diagram based on FIG. 3A.

FIG. 15 is the phasor diagram for the currents corresponding to the voltage phasor diagram in FIG. 3A. FIG. 15 is drawn for the H-mode balance point as given in Table II. At this balance point, $I_{30}$ in FIG. 3A is 78.6 percent. This is shown in FIG. 15 as the current marked $I_{12(30°)}$. This current lags the voltage $V_{12-3}$ by 30 degrees. At this H-mode balance point, $I_{60}$ in FIG. 3A is 22.7%. This is shown in FIG. 15 as current marked $I_{12(60°)}$, which lags the voltage $V_{12-3}$ by 60 degrees. The vector (phasor) sum of these two currents is $I_{12}$, which has a magnitude of 99% as given in Table II, and lags the voltage $V_{12-3}$ by 36.6 degrees. This is the "injected" current, or "manufactured" current, which is the winding current flowing from terminal 12 to terminal 3 in the motor winding.

Figure 16:
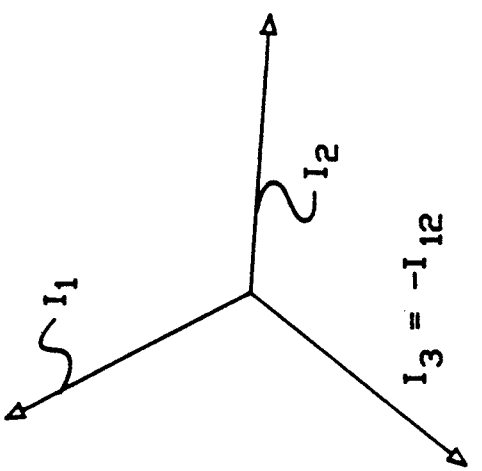
FIG. 16 is a phasor diagram of currents.

The current which enters the connection between terminals 10 and 11 also has two components. One component is the negative of $I_{12(60°)}$ because the capacitor which generates this current component is connected to terminal 10. The other component is generated as shown in FIG. 5 by the three capacitors, C1-10-L, C1-10-M, and C1-10-H. These capacitors have half the voltage and double the capacitance of the corresponding capacitors which generated $I_{12(30°)}$. Therefore, they generate exactly the same magnitude of current but at reversed (180°) phase. The sum of the two components entering the connection between terminals 10 and 11 is shown in FIG. 15 as $I_{10+11} = -I_{12}$. These two currents require, because of Kirchoff's law, that the currents in the three windings each be of magnitude 99 percent and each lag the winding voltage by 36.6 degrees. In FIG. 15, $I_2$ is shown lagging the winding voltage $V_{2-11}$ by this angle. $I_1$ is shown lagging the winding voltage $V_{1-10}$ by this angle of 36.6 degrees. The three winding currents are shown in a separate diagram in FIG. 16 to illustrate that the three windings are operating in the same manner as they would be if they were connected to a conventional three-phase supply. The currents are symmetrically spaced 120 degrees apart, and they are of equal magnitude. They display the conventional "wye" pattern. The phasor sum of $I_1+I_2+I_3$ is zero; thereby obeying Kirchoff's law. Thus a three-phase motor operating from a single phase supply has been provided.

Figure 18:
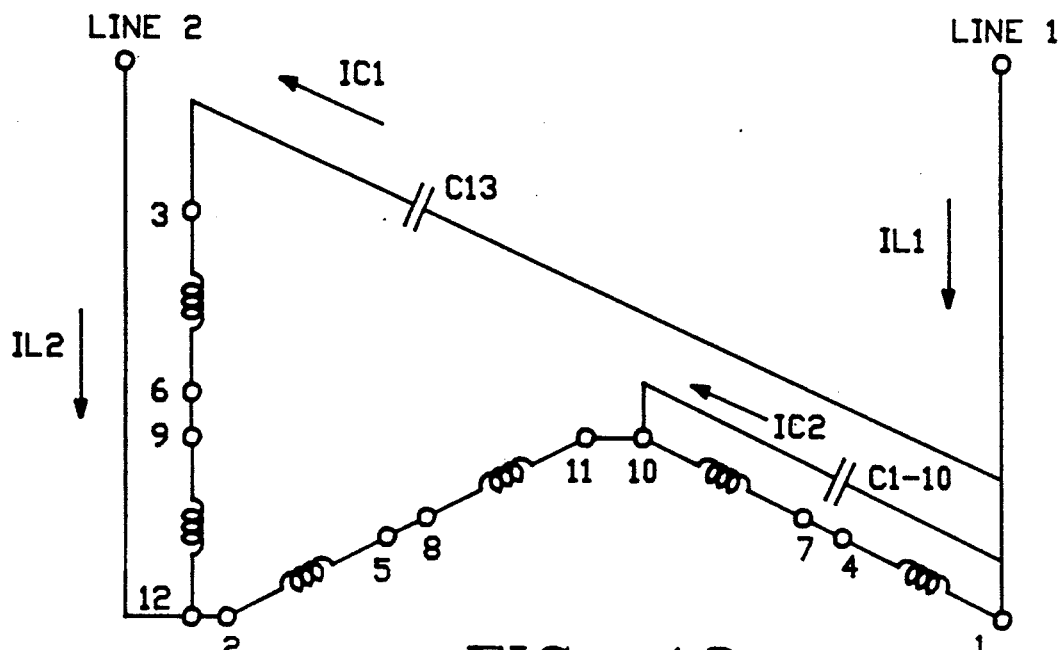
FIG. 18 is another alternative winding connection for FIG. 1.

For 2-pole motors with full-load current phase angles of 30 degrees lagging, a modification of FIG. 1 which is equally satisfactory is given in FIG. 18. The winding 3-12 in FIG. 1 is disconnected from terminal 1, and instead, terminal 12 is connected to terminal 2 in FIG. 18. The capacitor C2-12 in FIG. 1 is disconnected from terminals 2 and 12, and replaced by capacitor C13 in FIG. 18. Capacitor C13 will inject a 30-degree lagging current IC1=I-3-12 into winding 3-12, just as capacitor C2-12 did into the same winding in FIG. 1. The capacitor C1-C10 in FIG. 1 is retained in FIG. 18. This capacitor will inject a 30-degree lagging current IC2 into the 10-11 node. The two capacitors in FIG. 18 can provide balanced currents at 30-degrees lag in all three windings in FIG. 18.

Figure 19A:
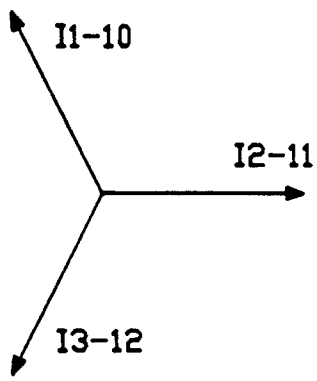
FIGS. 19A, 19B, 19C, and 19D are the current phasor diagrams for FIG. 18.
Figure 19B:
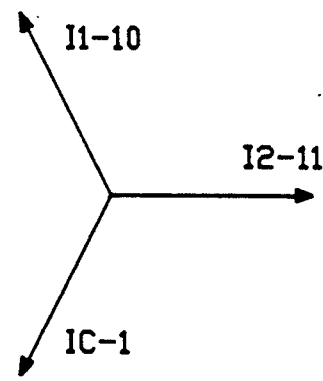
Figure 19C:
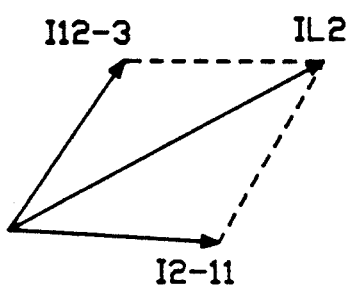
Figure 19D:
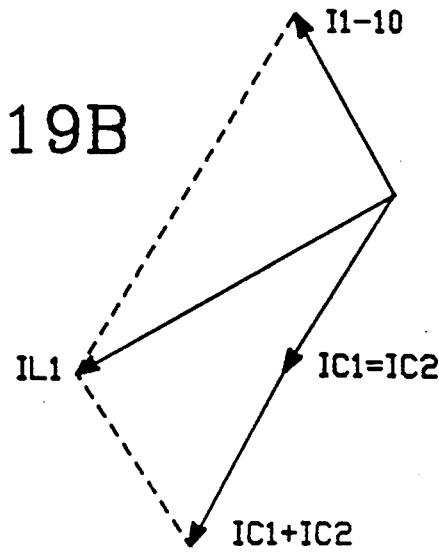

The current phasor diagrams for FIG. 18 are shown in FIGS. 19A-19D at the balanced condition. FIG. 19A shows the three winding currents, I1-10, I2-11 and I3-12 in windings 1-10, 2-11, and 3-12 respectively. FIG. 19B shows the three currents I1-10, I2-11, and IC2 entering the node 10-11. FIG. 19C shows the two currents I2-11 and I12-3 which sum to equal the Line 2 current. FIG. 19D shows the three currents I1-10, IC1, and IC2, which sum to equal the Line 1 current.

I have provided a three-phase squirrel-cage induction motor having four motor terminals with a first motor phase winding connected between a first motor terminal and a second motor terminal I a second motor phase winding connected between said second terminal and a third motor terminal, a third motor phase winding connected between said third motor terminal and a fourth motor terminal, a two-wire single phase power supply, means for connecting a first wire of the said power supply to said first motor terminal, means for connecting the second wire of the said power supply to said third motor terminal, means for connecting a first capacitor between said first motor terminal and said fourth motor terminals, and means for connecting a second capacitor between said first motor terminal and said second motor terminal.

a multi-phase induction machine has a rotating magnetic field which rotates with respect to the stationary stator windings at a synchronous speed. This field generates alternating voltages in each of the stator windings. There will be at least as many voltages as there are phases.

These concepts and relationships are well known to those engineers skilled in the art. In the book "Principles of Alternating Current Machinery", by Ralph R. Lawrence, published in 1940 by McGraw-Hill Book Company, on page 470, line 5, he states: "Operation of the Polyphase Induction Motor."—The stator winding of a polyphase induction motor is similar to the armature winding of a polyphase alternator. The polyphase currents in the stator winding produce a rotating magnetic field which corresponds to armature reaction in the alternator. The fundamental of this field revolves at synchronous speed with respect to the stator in the same way that the armature reaction of an alternator revolves with respect to the armature."

And on page 471, line 10, Lawrence states: "The speed of the receiving magnetic field depends upon the frequency and the number of poles for which the motor is wound and is independent of the number of phases. The only condition which must be fulfilled in regard to the number of phases is that the space relations of the windings for the different phases in electrical degrees must be the same as the time-phase relations of the current they carry. Thus for a three-phase winding, the windings must be 120 electrical degrees apart, and for a four-phase winding, they must be 90 electrical degrees apart."

Because of this fundamental relation, I have made throughout this patent disclosure, the phasor voltage diagrams and the corresponding winding connection diagrams to have the same angular relationships on the page. In general, I have drawn the connection diagrams so that their angles on the page are the same as the unloaded (zero-current) voltage phasor diagram would have had, and their lengths have been made proportional to the voltage magnitudes, and therefore unloaded voltages are proportional to the distances on the page in the circuit diagrams, just as the unloaded voltage phasor magnitudes are proportional to the lengths of the phasors.

Lawrence states, on page 472, line 26:

"In what follows the air-gap flux is assumed to be sinusoidal.

"The flux due to any one phase is alternating with respect to the winding. As in the transformer, it induces a voltage in the winding which is equal to the voltage impressed on the phase minus the impedance drop due to the resistance and leakage reactance of the winding. . . . FIG. 244 shows the developed stator of a three-phase induction motor. The dots represent inductors and the numbers indicate the phases to which the inductor belong. . . . Equation (240) shows that the flux density at any point b is sinusoidal with respect to time. It also shows that at any given time the space distribution of the air-gap flux is sinusoidal. . . . i.e., the magnetic field travels about the air gap at synchronous speed and has a constant value."

And on page 473, the last three lines: "It is evident from equations (241), (242) and (243) that the total flux through each phase is sinusoidal with respect to time and that the total fluxes linking the phases differ in time phase by 120 degrees."

This is the foundation for the wye-type circuit diagram shown in my FIG. 2A and the corresponding wy-type voltage phasor diagram in FIG. 20. FIG. 2A is the circuit for the higher voltage of a dual voltage motor. FIG. 21 is another voltage phasor diagram for the windings in FIGS. 2A and 2B, showing the winding voltage phase relations, but not intending to show any constraint regarding the winding circuit interconnections.

In the book "Alternating Current Machines", by Thomas C. McFarland, published in 1948 by D. Van Nostrand Company, on page 146, line 21, he states:

"4-4. The Rotating Field. A representation of the relative positions of the stator and rotor with their windings in given in FIG. 4-6. Briefly, the principle of operation may be stated as follows: With a three-phase motor, a three-phase voltage is impressed on the stator winding, and currents flow in the stator coils. . . . If designed as a two-pole motor, there will be two points of maximum resultant flux, at one of which the flux is going from the rotor to the stator and at the other, the direction is from the stator to the rotor. That is, there is one north and one south pole. If would for four poles, there will be four points of maximum resultant flux spaced one quarter of the circumference apart and alternating in polarity.

" . . . Since the current in the stator winding is alternating, the flux is alternating, and the flux linking with the rotor conductors changes.

" . . . The manner in which the coils are grouped causes the poles to revolve when a polyphase alternating voltage is impressed. "... The speed at which the poles rotate is called the synchronous speed, and equals 120×(the frequency)/(the number of poles). "... If the sign of either the time angle or the space angle is changed, the rotation is reversed. The time angle is changed by interchanging any two of the terminal leads of a polyphase motor. The space angle is changed by changing the group order of the winding.

"4-5. Production of Torque. Since the poles rotate, the magnetic flux set up by them rotates at synchronous speed, ..."

McFarland also describes the rotating magnetic field in the air gap of the induction machine. The time phase of this field with respect to any one winding determines the time phase of the generated voltage in that winding due to this field.

The voltages supplied to a polyphase induction machine have the same phasors as the voltages from the transformer bank supplying the machine.

In the book "Alternating Current Machinery" by John Myron Bryant and Elmer Walter Johnson, published in 1935 by McGraw-Hill Book Company, on page 250 they describe the relation between the transformer windings and the voltage phasors:

"a. Three-wire, Three-phase Y to Three-wire, Three-phase Y. The method of making this connection is illustrated in FIGS. 146 and 147, and the vector diagrams of voltages and currents for a unity-power-factor load are shown in FIG. 148 and 149."

It can be seen that the phasor $V_{12}$ in FIG. 148 is parallel to the winding from 1 to 2 in FIG. 146. The phasor $V_{34}$ in FIG. 148 is parallel to the winding from 3 to 4 in FIG. 146. The phasor $V_{56}$ in FIG. 148 is parallel to the winding from 5 to 6 in FIG. 146.

I am using the same relationship between my windings in FIG. 2A and the corresponding phasor diagram in FIG. 20. I am using the same relationship between my windings in FIG. 2B and the corresponding phasor diagrams in FIGS. 3 and 27.

In my FIG. 2B, I have reconnected the windings from FIG. 2A. To construct the voltage phasor diagram in FIG. 3 corresponding to FIG. 2B, I have used the phasors shown in FIG. 21 and moved them (each with the constraint of constant magnitude and constant phase) to represent the new winding interconnections.

I will use the same relationship between my delta windings in FIG. 22 and the corresponding delta phasor diagram in FIG. 23.

Bryant and Johnson show on page 252 in FIG. 150 a delta connection of windings 1-2, 3-4, and 5-6. They show in FIG. 152 the corresponding phasors $V_{12}$, $V_{34}$, and $V_{56}$, which form a closed triangle, just as the circuit was a closed triangle. If the connection between terminals 1 and 6 were opened, the voltage across the opening will be quite small. Similarly, the three phasors will add up to either zero voltage, or a very small phasor from 6 to 1 across the arrow tip of $V_{56}$ to the start of the phasor 12. This relationship is essential in distinguishing between a delta connection of three windings which seem to be in series, and the "bathtub" connection of the three windings in FIG. 2B which also seem to be in series. In the latter "bathtub" connection, the voltage across the terminals from 2 to 12 is double the voltage of one of the windings.

I have shown in FIG. 22 a reconnection of the windings from FIG. 2A into a delta configuration. The electrical connection from terminal 2 to terminal 12 has been omitted so that this is an "unclosed" delta circuit.

The corresponding voltage phasor diagram for FIG. 22 is given in FIG. 23. It can be seen that the voltage from terminal 2 to terminal 12 is very small across the "opening" or "gap" of the "unclosed" delta circuit.

Where a delta circuit is intended in actual practice, there will be an electrical connection of terminal 2 to terminal 12, and the voltage from 2 to 12 will be zero.

When three windings have been connected in series as shown in FIG. 22, and there is no connection from terminal 2 to terminal 12, the voltage $V_{2\text{-}12}$ is very small if the voltage phasor relations are as shown in FIG. 23. The same three windings can also be connected in series as shown in FIG. 2B, and the voltage $V_{2\text{-}12}$ is very large if the voltage phasor relations are as shown in FIG. 3. It is necessary to define the phasor relations in order to distinguish between the two different series connections in FIG. 2B and in FIG. 22.

If the three windings were incorrectly connected in a delta configuration, as shown in the circuit in FIG. 22, the voltage across the opening between 2 and 12 would be very small, as shown by the corresponding phasor diagram in FIG. 23.

The corresponding voltage phasor diagrams for an induction motor as the same as for the transformers which supply the machine, as shown by the voltage phasors in Bryant and Johnson FIG. 148 for a WYE connection, and in FIG. 152 for a DELTA connection.

Bryant and Johnson on page 464, two lines from the bottom of the page, state: "6. Terminal Emf of Three-Phase Machines.—The emf per phase of a full pitch, concentrated winding is given in Eq. (706). ... In any Y-connected, three-phase machine, the three similar emf waves between the terminals of the machine will be represented by the following equations derived from Eq. (706), as $$e_{OA} = E_{m1} \sin wt + \ldots \text{ volts} \quad (736)$$

$$e_{OB} = E_{m1} \sin (wt + 120°) + \ldots \text{ volts} \quad (737)$$

and $$e_{OC} = E_{m1} \sin (wt - 120°) + \ldots \text{ volts} \quad (738)$$

A, B, and C being the terminals of the machine and O the point of common connection of the coils or the neutral of the machine. Since, in this Y-connected, three-phase machine, the ends of the coils are connected together at O, as shown in FIG. 324, so that the fundamentals of the emf waves are at 120 deg. with each other, then $$e_{AB} = e_{OB} - e_{OA} \text{ volts} \quad (739)$$

in the emf between the terminals A and B ...".

Bryant and Johnson also show a delta connection of the same coils in their FIG. 325. They show in their Eqs. (744), (745), and (746) that the three winding voltages are 120° apart.

Bryant and Johnson, on page 569, state: "2. Polyphase Rotating Field.—Since the primary or stator of the polyphase induction motor is wound like the armature of a synchronous machine, it produces mmf of the same wave forms as have been discussed in Chap. XIX, ... For integral-slot, three-phase windings, the components of the mmf consist of a fundamental harmonic rotating forward at synchronous speed with respect to the primary, ... etc."

And on page 572, line 15: "The angle (theta), therefore, varies directly with the time, and the resultant field has a constant synchronous speed."

And on page 572, line 34: "The speed of the rotating field in respect to the stator is determined from the number of poles and the frequency as in the synchronous motor and generator; i.e., $$n = (60f)/p \text{ rpm} \qquad (915)\ldots"$$

These references provide adequate foundation for my statements and claims using the vocabulary of rotating magnetic fields and the corresponding voltages generated by the said fields.

Equations (736), (737), and (738) show that the fundamental component of the emfs induced in the three windings A, B, and C in FIG. 324 are 120° apart in phase, so that the phasor diagram of the induced voltages is also a symmetrical WYE with phasors 120° apart.

Equations (744), (745), and (746) show that the fundamental component of the emfs induced in the three windings OA, OB, and OC in FIG. 325 are 120° apart in phase, so that the phasor diagram of the induced voltages is also a symmetrical DELTA with phasors 120° apart.

A comparison of FIGS. 324 and 325 shows that the phasor voltage associated with a winding such as OA is the same, whether the winding is connected in a WYE or in a DELTA.

A comparison of FIGS. 324 and 325 shows that the phasor voltage associated with a winding such as OB is the same, whether the winding is connected in a WYE or in a DELTA.

A comparison of FIGS. 324 and 325 shows that the phasor voltage associated with a winding such as OC is the same, whether the winding is connected in a WYE or in a DELTA.

In my FIG. 21, I have shown the 120-degree winding voltage phasor relations as described by Bryant and Johnson.

FIG. 24 is the motor winding circuit connection for the lower voltage of a dual-voltage motor. In FIG. 24, the phasor voltages are $$V_{1-10} = V_{1-4} = V_{7-10}$$

$$V_{2-11} = V_{2-5} = V_{8-11}$$

$$V_{3-12} = V_{3-6} = V_{9-12}$$

FIG. 20 is also the corresponding wye-type voltage phasor diagram for the circuit in FIG. 24. In both the circuit of FIG. 2A and of FIG. 24, only terminals 1, 2, 3, 10, 11, and 12 need to be brought out from the machine windings. For this reason, only these terminals are shown in FIGS. 1, 4, and 5. Correspondingly, only these terminals are used in the phasor diagrams of my FIGS. 3, 20, 21, 23, 25, 26, and 27.

Sometimes winding and phasor designations are used for three-phase circuits which result in describing the voltage phases as 60 degrees apart. This is shown in the phasor diagram in FIG. 25, which also pertains to the windings in FIG. 2B. FIG. 25 is another voltage phasor diagram for the individual three windings in FIG. 1 or 2A or 4 or 24 without a specification of the interconnection between the three windings.

Herein, the phasor voltage 10-to-1 in FIG. 25 has the same angle as in FIGS. 3, 20, 21, and 23, even though the circuits are different in FIGS. 2A, 2B, 22, and 24. These four circuits are for WYE, higher voltage; "BATHTUB"; DELTA; and WYE, lower voltage; respectively.

The motor in FIG. 2A can be described as follows: a first winding connected between a first terminal (1) and a fourth terminal (10), a second motor winding connected between a second terminal (2) and a fifth terminal (11), a third motor winding connected between a third terminal (3) and a sixth terminal (12), said windings polarized such that if said terminals four (10), five (11), and six (12), were connected together as shown in FIG. 2A, then terminals one, two and three would comprise a wye-connected three-phase motor as shown in FIG. 2A.

My invention is a reconnection of these windings as shown in FIGS. 2B, 1, and 4, in which there is an electrical connection of the said fourth terminal (10) to the said fifth terminal (11), an electrical connection of said first terminal (1) to said third terminal (3), a two-wire single-phase power supply, L1 and L2 in FIGS. 1 and 4, a first wire of the said power supply L1 connected to said first terminal (1), the second wire of said power supply L2 connected to said second terminal (2), and means for connecting a first capacitor C2-12 in FIGS. 1 and 4 between said second motor terminal (2) and said sixth motor terminal (12).

My invention is therefore a three-phase induction motor with a first motor winding connected between a first terminal and a fourth terminal, a second motor winding connected between a second terminal and a fifth terminal, a third motor winding connected between a third terminal and a sixth terminal, said windings polarized such that if said terminals four, five, and six were connected together then said terminals one, two and three would comprise a wye-connected three-phase motor, an electrical connection of said fourth terminal to said fifth terminal, an electrical connection of said first terminal to said third terminal, a two-wire single-phase power supply, a first wire of the said power supply connected to said first terminal, the second wire of said power supply connected to said second terminal, and means for connecting a first capacitor between said second motor terminal and said sixth motor terminal.

My invention is therefore a three-phase induction motor with a first winding connected between a first terminal and a fourth terminal, a second winding connected between a second terminal and a fifth terminal, a third winding connected between a third terminal and a sixth terminal, said windings polarized such that if said terminals four, five, and six were connected together then said terminals one, two and three would comprise a wye-connected three-phase motor, an electrical connection of said fourth terminal to said fifth terminal, an electrical connection of said first terminal to said third terminal, a two-wire single-phase power supply, a first wire of the said power supply connected to said first terminal, the second wire of said power supply connected to said second terminal, and means for connecting a first capacitor between said second motor terminal and said sixth motor terminal.

In accordance with my FIG. 22, which has a delta configuration, I have a three-phase induction motor with a first winding connected between a first terminal (1) and a fourth terminal (10), a second motor winding connected between a second terminal (2) and a fifth terminal (11), a third motor winding connected between a third terminal (3) and a sixth terminal (12), said windings polarized such that if said terminals one (1) and five (11) were connected together, and if terminals three (3) and four (10) were connected together, and if terminals two (2) and six (12) were connected together, then terminals one, two and three would comprise a delta-connected three-phase motor, as shown in FIG. 22 when the delta is closed by a connection from (2) to (12).

My invention is a reconnection of the windings from FIG. 22 into the circuit of either FIG. 1 or FIG. 2B or FIG. 4, in which there is an electrical connection of the said fourth terminal (10) to the said fifth terminal (11), an electrical connection of said first terminal (1) to said third terminal (3), a two-wire single-phase power supply, L1 and L2 in FIGS. 1 and 4, a first wire of the said power supply L1 connected to said first terminal (1), the second wire of said power supply L2 connected to said second terminal (2), and means for connecting a first capacitor C2-12 in FIGS. 1 and 4 between said second motor terminal (2) and said sixth motor terminal (12).

My invention is therefore a three-phase induction motor with a first winding connected between a first terminal and a fourth terminal, a second motor winding connected between a second terminal and a fifth terminal, a third motor winding connected between a third terminal and a sixth terminal, said windings polarized such that if said terminals one and five were connected together, and if terminals three and four were connected together, and if terminals two and six were connected together, then terminals one, two and three would comprise a delta-connected three-phase motor, an electrical connection of said fourth terminal to said fifth terminal, an electrical connection of said first terminal to said third terminal, a two-wire single-phase power supply, a first wire of the said power supply connected to said first terminal, the second wire of said power supply connected to said second terminal, and means for connecting a first capacitor between said second motor terminal and said sixth motor terminal.

The same voltages as in FIGS. 2A and 2B can be defined in a slightly different manner by reference to the corresponding phasor diagrams in FIGS. 26 and 27. In FIG. 26, the wye phasors are assembled in the reverse order to FIG. 2A, so that terminals 1, 2, and 3 are connected together for the center of the wye. In FIG. 26, the rotating flux in the motor air gap will generate a first alternating voltage difference in the first winding (2-11) from its first terminal (2) to its second terminal (11) which leads in phase by 120 electrical degrees a second generated alternating voltage difference in the second winding (3-12) from its first terminal (3) to its second terminal (12), and said second alternating voltage leads in phase by 120 electrical degrees a third generated alternating voltage difference in the third winding (1-10) from its first terminal (1) to its second terminal (10). In my invention, the windings are connected so that a first wire (L2) of a single phase supply is connected to the first terminal (2) of the first winding, the second wire (L1) of the said supply is connected to the first terminal (3) of the second winding and also to the first terminal (1) of the third winding, the second terminal (11) of the first winding is connected to the second terminal (10) of the third winding, and a capacitor (C2-12) is connected between the second terminal (12) of the second winding and the first wire (L2) of the said supply.

These connections result in the circuit diagrams of FIGS. 1, 2B and 4. The phasor diagram for these circuits using this notation is shown in FIG. 27. Note that the voltage across the capacitor from (2) to (12) is approximately double the value of the voltage from (10) to (1). The voltage from 2 to 12 in FIGS. 22 and 23 is very much smaller than the voltage from 1 to 10 in FIG. 23.

My invention is therefore a three-winding three-phase motor, each winding having first and second terminals so polarized that a rotating flux in the motor air-gap will generate a first alternating voltage difference in the first winding from its first terminal to its second terminal which leads in phase by 120 electrical degrees a second generated alternating voltage difference in the second winding from its first terminal to its second terminal, and said second alternating voltage leads in phase by 120 electrical degrees a third generated alternating voltage difference in the third winding from its first terminal to its second terminal, a two-wire single-phase supply, a first wire of said supply connected to the first terminal of the first winding, the second wire of said supply connected to the first terminal of the second winding and also to the first terminal of the third winding, the second terminal of the first winding connected to the second terminal of the third winding, and a capacitor connected between the second terminal of the second winding and the first wire of the said supply.

FIG. 25 shows another orientation of the phasor diagram for the circuit in FIG. 2B. FIG. 25 is drawn for a squirrel-cage induction motor with three windings, so designated that the first winding leads the second winding by 60 degrees, and the second winding leads the third winding by 60 degrees. The motor contains a rotating magnetic field, said motor having four terminals with a first winding (2-11) connected between a first motor terminal (2) and a second motor terminal (11-10), the internal magnetic polarity of said first winding from said first terminal (2) to said second terminal (11-10) with respect to said magnetic field having a first phase, a second winding (10-1) connected between said second motor terminal (11-10) and a third motor terminal (1-3), a second internal phase of said second winding from said second terminal (11-10) to said third terminal (1-3) with respect to said magnetic field, said second phase having a phase magnitude with respect to said first phase nominally lagging 60 degrees, and in operation more than 30 degrees and less than 90 degrees, a third winding (3-12) connected between said third motor terminal (1-3) and a fourth motor terminal (12), a third internal phase of said third winding from said third terminal (1-3) to said fourth terminal (12) with respect to said magnetic field, said third phase having a phase magnitude with respect to said second phase nominally lagging 60 degrees and in operation more than 30 degrees and less than 90 degrees, a two-wire single-phase power supply, a first wire (L2) of said power supply connected to said first motor terminal (2), the second wire (L1) of said power supply connected to said third motor terminal (1-3), a first capacitor (C2-12) connected between said first motor terminal (2) and said fourth motor terminal (12), and means for connecting a second capacitor (C1-10) between said second motor terminal (11-10) and said third motor terminal (1-3).

FIG. 28 shows the power circuit of FIG. 4 with a current transformer inserted in series with the winding from 2 to 11. The current in this winding was observed to increase with increased shaft torque, and to decrease with decreased shaft torque. The current was proportional to shaft load, but not with a constant coefficient of proportionality. This current was an excellent signal which was used to control the solid-state relay 2-12. This relay was closed for high currents corresponding to high shaft torques, and was opened for low currents corresponding to low shaft torques.

My invention includes a squirrel-cage induction motor having four motor terminals with a first winding connected between a first motor terminal and a second motor terminal, a second winding connected between said second motor terminal and a third motor terminal, a third winding connected between said third motor terminal and a fourth motor terminal, a two-wire single-phase power supply, means for connecting a first wire of the said power supply to said first motor terminal, means for connecting the second wire of the said power supply to said third motor terminal, means for connecting a first capacitor between said first motor terminal and said fourth motor terminal, means for connecting a second capacitor between said second motor terminal and said third motor terminal, wherein said motor is a three-phase motor, and wherein said first winding is a first motor phase winding, and wherein said second winding is a second motor phase winding, and wherein said third winding is a third motor phase winding, means for connecting a third capacitor between said second motor terminal and said fourth motor terminal, including means responsive to the alternating current in said first motor winding to control the said means for connecting said first capacitor.

Figure 29:
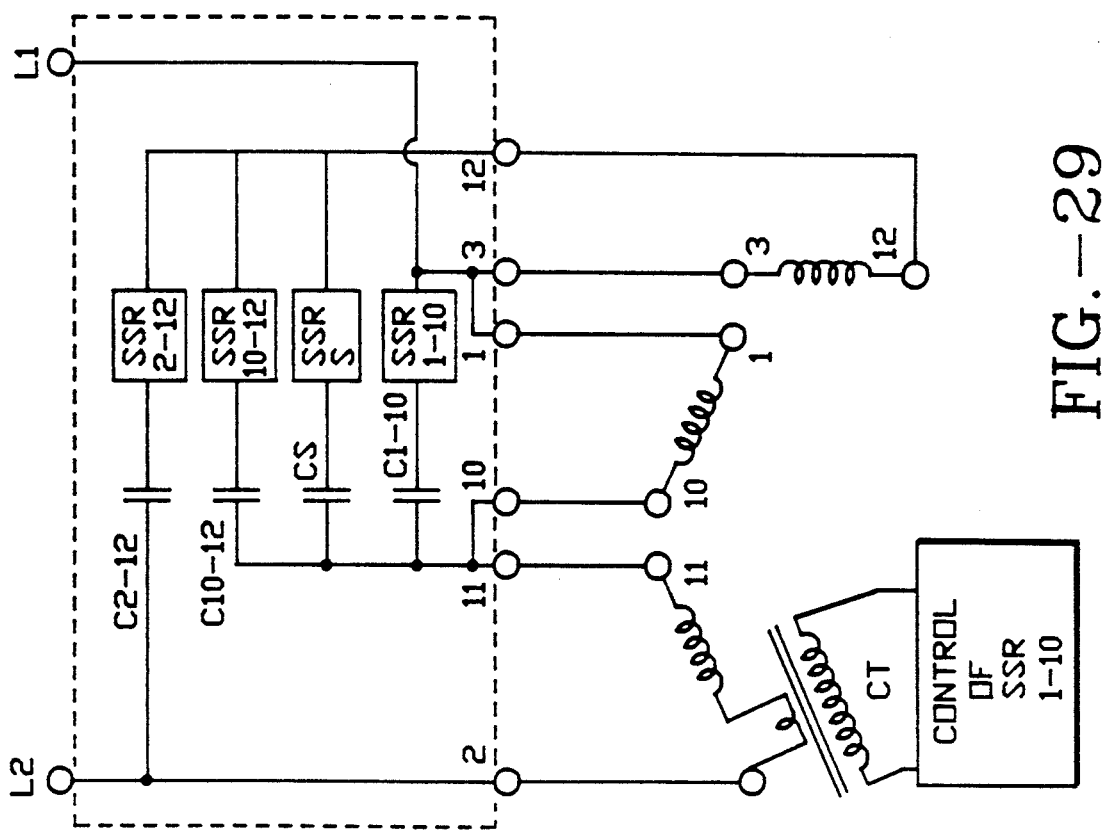
FIG. 29 is the circuit in FIG. 4 with a current transformer to sense and measure the current in winding 2-11 and control the solid-state relay 1-10 for the capacitor 1-10.

FIG. 29 shows the current transformer controlling the solid-state relay 1-10.

Figure 30:
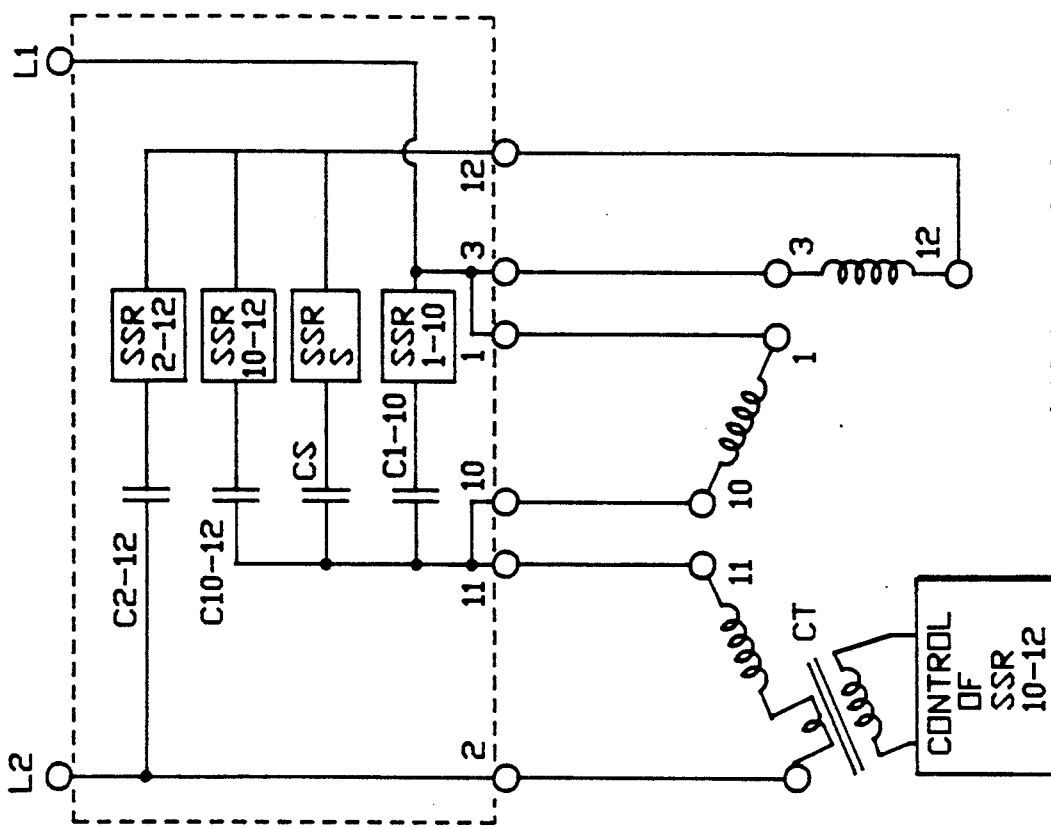
FIG. 30 is the circuit in FIG. 4 with a current transformer to sense and measure the current in winding 2-11 and control the solid-state relay 10-12 for the capacitor 10-12.

FIG. 30 shows the current transformer controlling the solid-state relay 10-12. All three of these relays should be controlled in a marketable motor.

Figure 31:
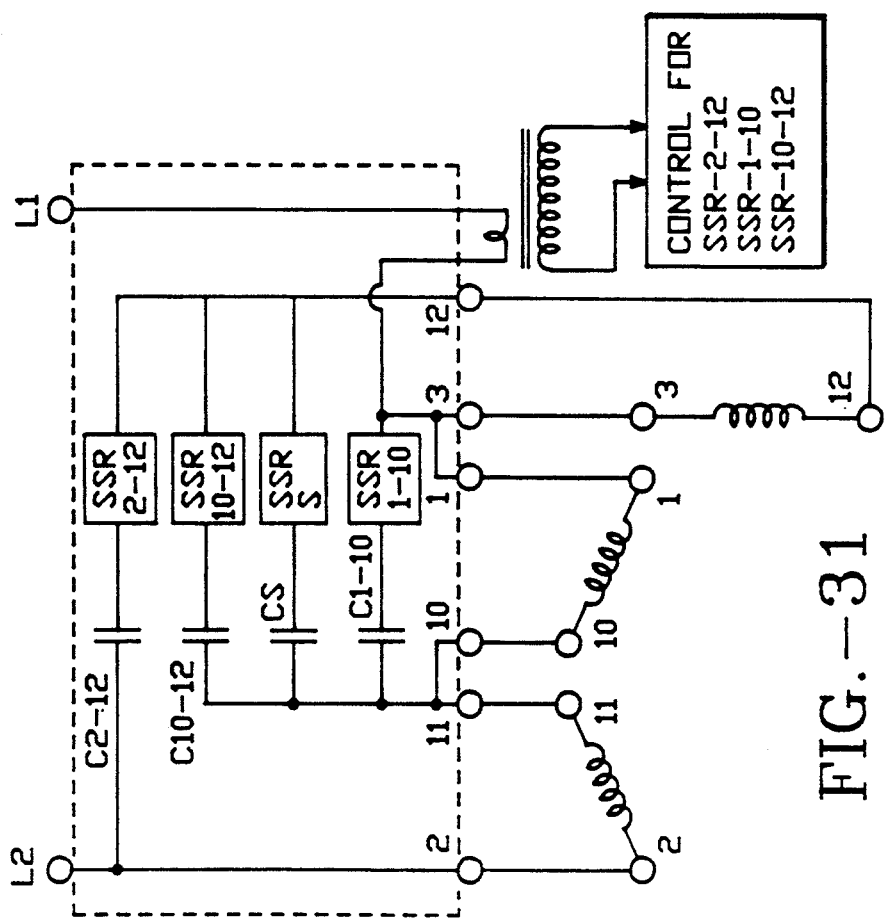
FIG. 31 is the circuit in FIG. 4 with a current transformer to sense and measure the current in the power-supply line L1 and control the solid-state relays SSR-1-10, SSR-2-12, and SSR-10-12.

FIG. 31 shows a current transformer sensing the power-supply current in line L1 and using this information to control each and all of the solid-state relays.

Figure 32:
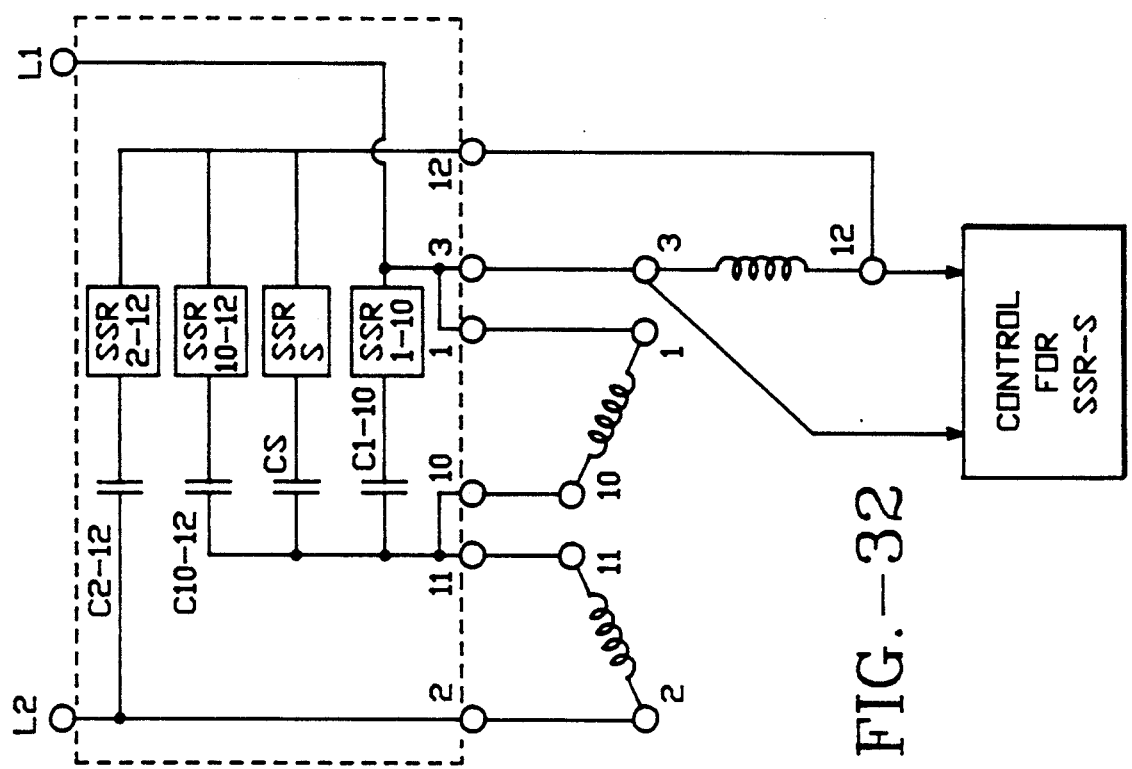
FIG. 32 is the circuit in FIG. 4 with the voltage across winding 3-12 sensed and measured to control the insertion of the starting capacitor by the solid-state relay switch SSR-S.

FIG. 32 shows a control module using the sensed voltage across the winding 3-12 to control the insertion of the starting capacitor by the solid-state relay SSR-S. This is a method similar to that used on the quadrature winding of a single-phase motor which is well known to those skilled in the art.

What is claimed is:

1. A squirrel-cage induction motor having four motor terminals with a first winding connected between a first motor terminal and a second motor terminal, a second winding connected between said second motor terminal and a third motor terminal, a third winding connected between said third motor terminal and a fourth motor terminal, a two-wire single-phase power supply, a first wire of the said power supply connected to said first motor terminal, the second wire of the said power supply connected to said third motor terminal, a first capacitor connected between said first motor terminal and said fourth motor terminal, and means for connecting a second capacitor between said second motor terminal and said third motor terminal.

2. A motor as in claim 1, wherein said motor is a three-phase motor, and wherein said first winding is a first motor phase winding, and wherein said second winding is a second motor phase winding, and wherein said third winding is a third motor phase winding, and means for connecting a third capacitor between said second motor terminal and said fourth motor terminal.

3. A motor as in claim 2, including first controllable-switch means for said means for connecting said first capacitor, second controllable-switch means for said means for connecting said second capacitor, and third controllable-switch means for said means for connecting said third capacitor.

4. A motor as in claim 3, wherein said first controllable-switch means is a first solid-state relay, and wherein said second controllable-switch means is a second solid-state relay, and wherein said third controllable-switch means is a third solid-state relay.

5. A motor as in claim 3, including first sensing means for sensing the voltage between said third motor terminal and said fourth motor terminal, and means responsive to said voltage to control said first controllable-switch means.

6. A motor as in claim 5, wherein said means responsive to said voltage is responsive to the magnitude of the alternating-current voltage.

7. A motor as in claim 5, wherein said means responsive to said voltage is responsive to the rate of change of the magnitude of the alternating-current voltage.

8. A motor as in claim 5, including additional means responsive to said voltage to also control said second and said third controllable switches.

9. A motor as in claim 5, including means responsive to the rate of change of the said voltage to control said first controllable switch.

10. A motor as in claim 5, including means responsive to the capacitor voltage across the first capacitor to control said first controllable switch.

11. A motor as in claim 5, including means responsive to the capacitor voltage across the said second capacitor to control said first controllable switch.

12. A motor as in claim 2, including first sensing means for sensing the voltage between said third motor terminal and said fourth motor terminal, and means responsive to said voltage to control said means for connecting said first capacitor.

13. A motor as in claim 2, including means responsive to the capacitor voltage across said first capacitor to control said means for connecting said first capacitor.

14. A motor as in claim 2, including sensing means responsive to the capacitor voltage across the said second capacitor, and means responsive to said sensing means to connect and disconnect said first capacitor.

15. A motor as in claim 2, including means to sense the voltage between the said third motor terminal and the said fourth motor terminal, and means responsive to said voltage to connect and disconnect said first capacitor.

16. A motor as in claim 2, including means to sense the voltage between the said third motor terminal and the said fourth motor terminal, and means responsive to said voltage to connect and disconnect said third capacitor.

17. A motor as in claim 2, including first solid-state relay means for said means for connecting said first capacitor, second solid-state relay means for said means for connecting said second capacitor, and third solid-state relay means for said means for connecting said third capacitor.

18. A motor as in claim 17, including first sensing means for sensing the voltage between said third motor terminal and said fourth motor terminal, and means responsive to said voltage to control said first solid-state relay means.

19. A motor as in claim 18, including means responsive to said voltage to control said second and said third solid-state relay means.

20. A motor as in claim 18, including means responsive to the rate of change of said voltage to control said first solid-state relay means.

21. A motor as in claim 18, including means responsive to the capacitor voltage across the said first capacitor to control said first solid-state relay means.

22. A motor as in claim 18, including means responsive to the capacitor voltage across the said second capacitor to control said first solid-state relay means.

23. A motor as in claim 2, including a starting circuit comprising a starting capacitor connected in series with a starting switch, said circuit being connected between said second motor terminal and said fourth motor terminal.

24. A motor as in claim 23, including means responsive to a current in one of the motor windings to control said starting switch.

25. A motor as in claim 23, including means responsive to a current in one of the said wires of the said power supply to control said starting switch.

26. A motor as in claim 23, including means for sensing the voltage on the said fourth motor terminal to control said starting switch.

27. A motor as in claim 2, including means for connecting said first capacitor and means responsive to the alternating current in said first motor phase winding to control the said means for connecting said first capacitor.

28. A motor as in claim 2, including means responsive to the alternating current in said first motor phase winding to control the said means for connecting said second capacitor.

29. A motor as in claim 2, including means responsive to the alternating current in said first motor phase winding to control the said means for connecting said third capacitor.

30. A three-winding three-phase motor, each winding having first and second winding terminals so polarized that a rotating flux in the motor air-gap will generate a first alternating voltage difference in the first winding from its first terminal to its second terminal which leads in phase by 120 electrical degrees a second generated alternating voltage difference in the second winding from its first terminal to its second terminal, and said second alternating voltage leads in phase by 120 electrical degrees a third generated alternating voltage difference in the third winding from its first terminal to its second terminal, a two-wire single-phase supply, a first wire of said supply connected to the first terminal of the first winding, the second wire of said supply connected to the first terminal of the second winding and also to the first terminal of the third winding, the second terminal of the first winding connected to the second terminal of the third winding, and a first capacitor connected between the second terminal of the second winding and the first wire of the said supply.

31. A three-phase motor as in claim 30 including a second capacitor connected between said second terminal of said first winding and said second terminal of said second winding.

32. The method of exciting a three-winding three-phase motor, each winding having first and second winding terminals so polarized that a rotating flux in the motor air-gap will generate a first alternating voltage difference in the first winding from its first terminal to its second terminal which leads in phase by 120 electrical degrees a second generated alternating voltage difference in the second winding from its first terminal to its second terminal, and said second alternating voltage leads in phase by 120 electrical degrees a third generated alternating voltage difference in the third winding from its first terminal to its second terminal, a two-wire single-phase supply, a first wire of said supply connected to the first terminal of the first winding, the second wire of said supply connected to the first terminal of the second winding and also to the first terminal of the third winding, the second terminal of the first winding connected to the second terminal of the third winding, and a first capacitor connected between the second terminal of the second winding and the first wire of the said supply.

33. The method as in claim 32 comprising generating a first alternating current which lags the voltage in said second winding by approximately 30 degrees, and introducing said first current into said second winding at said second winding terminal through said first capacitor, generating a second alternating current which lags said voltage in said second winding at said second winding terminal of said second winding through a second capacitor connected from the said second terminal of said first winding to the said second winding terminal of the said second winding, whereby the other two of the three windings of said motor are excited by their series connection between said first wire and the second wire of the said single-phase supply.

34. The method as in claim 32 where said first and second windings are in series across said two-wire single-phase supply including the step of exciting the second winding terminal of said second winding by a composite current generated by the sum of two different alternating currents with different phase angles.

35. A method as in claim 34, wherein one of said two different alternating currents leads the phase of the other of said two different alternating currents by thirty degrees.

36. A method as in claim 34, wherein the connection between the two windings in series is a motor terminal, and wherein one of said two different alternating currents is generated by said first capacitor connected to the first wire of the said supply, and wherein the other of said two different alternating currents is generated by a second capacitor connected to said motor terminal.

37. A method as in claim 34, wherein said composite current is generated with a resultant phase with respect to said third voltage difference in the said third motor winding so that the resultant flux field in the motor is approximately constant in magnitude and rotating at approximately constant angular velocity.

38. A squirrel-cage induction motor containing a rotating magnetic field, said motor having four terminals with a first winding connected between a first motor terminal and a second motor terminal, the internal magnetic polarity of said first winding from said first terminal to said second terminal with respect to said magnetic field having a first phase, a second winding connected between said second motor terminal and a third motor terminal, a second internal phase of said second winding from said second terminal to said third terminal with respect to said magnetic field, said second phase having a phase magnitude with respect to said first phase nominally lagging 60 degrees, and in operation more than 30 degrees and less than 90 degrees, a third winding connected between said third motor terminal and a fourth motor terminal, a third internal phase of said third winding from said third terminal to said fourth terminal with respect to said magnetic field, said third phase having a phase magnitude with respect to said second phase nominally lagging 60 degrees and in operation more than 30 degrees and less than 90 degrees, a two-wire single-phase power supply, a first wire of said power supply connected to said first motor terminal, the second wire of said power supply connected to said third motor terminal, a first capacitor connected between said first motor terminal and said fourth motor terminal, and means for connecting a second capacitor between said second motor terminal and said third motor terminal.

39. A three-phase induction motor with a first motor winding connected between a first terminal and a fourth terminal, a second motor winding connected between a second terminal and a fifth terminal, a third motor winding connected between a third terminal and a sixth terminal, said windings polarized such that if said terminals four, five, and six were connected together then said terminals one, two and three would comprise a wye-connected three-phase motor, an electrical connection of said fourth terminal to said fifth terminal, an electrical connection of said first terminal to said third terminal, a two-wire single-phase power supply, a first wire of the said power supply connected to said first terminal, the second wire of said power supply connected to said second terminal, and means for connecting a first capacitor between said second motor terminal and said sixth motor terminal.

40. A motor as in claim 39, including a second capacitor connected between said second terminal and said fifth terminal.

41. A motor as in claim 43, including a second capacitor connected between said second terminal and said fifth terminal.

42. A motor as in claim 41, including a third capacitor connected between said fourth terminal and said sixth terminal.

43. A three-phase induction motor with a first motor winding having a designated first terminal and a fourth terminal, a second motor winding having a designated second terminal and a fifth terminal, a third motor winding having a designated third terminal and a sixth terminal, said windings polarized such that if said terminals four, five, and six were connected together then said terminals one, two and three would comprise a wye-connected three-phase motor, an electrical connection of said fourth terminal to said fifth terminal, an electrical connection of said second terminal to said third terminal, a two-wire single-phase power supply, a first wire of the said power supply connected to said first terminal, the second wire of said power supply connected to said second terminal, and means for connecting a first capacitor between said first terminal and said sixth terminal.

44. A three-phase induction motor with a first winding connected between a first terminal and a fourth terminal, a second winding connected between a second terminal and a fifth terminal, a third winding connected between a third terminal and a sixth terminal, said windings polarized such that if said terminals four, five, and six were connected together then said terminals one, two and three would comprise a wye-connected three-phase motor, an electrical connection of said fourth terminal to said fifth terminal, an electrical connection of said first terminal to said third terminal, a two-wire single-phase power supply, a first wire of the said power supply connected to said first terminal, the second wire of said power supply connected to said second terminal, and means for connecting a first capacitor between said second terminal and said sixth terminal.

45. A motor as in claim 44, including a second capacitor connected between said first terminal and said fourth terminal.

46. A motor as in claim 45, including a third capacitor connected between said fourth terminal and said sixth terminal.

47. A motor as in claim 46, wherein said third capacitor is a starting capacitor, and wherein the voltage between said third terminal and said sixth terminal is sensed to produce a control signal, and wherein said control signal controls the insertion and removal of the said third capacitor.

48. A three-phase induction motor with a first winding connected between a first terminal and a fourth terminal, a second motor winding connected between a second terminal and a fifth terminal, a third motor winding connected between a third terminal and a sixth terminal, said windings polarized such that if said terminals one and five were connected together, and if terminals three and four were connected together, and if terminals two and six were connected together, then terminals one, two and three would comprise a delta-connected three-phase motor, an electrical connection of said fourth terminal to said fifth terminal, an electrical connection of said first terminal to said third terminal, a two-wire single-phase power supply, a first wire of the said power supply connected to said first terminal, the second wire of said power supply connected to said second terminal, and means for connecting a first capacitor between said second terminal and said sixth terminal.

49. A motor as in claim 48, including a second capacitor connected between said second terminal and said fifth terminal.

50. A motor as in claim 49, including a third capacitor connected between said fourth terminal and said sixth terminal.

51. A three-phase induction motor with a first winding connected between a first terminal and a fourth terminal, a second motor winding connected between a second terminal and a fifth terminal, a third motor winding connected between a third terminal and a sixth terminal, said windings polarized such that if said terminals one and six were connected together, and if terminals two and four were connected together, and if terminals three and five were connected together then said terminals one, two and three would comprise a delta-connected three-phase motor, an electrical connection of said fourth terminal to said fifth terminal, an electrical connection of said first terminal to said third terminal, a two-wire single-phase power supply, a first wire of the said power supply connected to said first terminal, the second wire of said power supply connected to said second terminal, and means for connecting a first capacitor between said second terminal and said sixth terminal.

52. A motor as in claim 51, including a second capacitor connected between said first terminal and said fourth terminal.

53. A motor as in claim 52, including a third capacitor connected between said fourth terminal and said sixth terminal.

54. A squirrel-cage induction motor having four motor terminals with a first winding connected between a first motor terminal and a second motor terminal, a second winding connected between said second motor terminal and a third motor terminal, a third winding connected between said third motor terminal and a fourth motor terminal, a two-wire single-phase power supply, a first wire of said power supply connected to said first motor terminal, the second wire of said power supply connected to said third motor terminal, the voltage between said first motor terminal and said second motor terminal being a first voltage, the voltage between said second motor terminal and said third motor terminal being a second voltage, the voltage between said third motor terminal and said fourth motor terminal being a third voltage, the voltage between said first motor terminal and said fourth motor terminal being a fourth voltage, the magnitude of said fourth voltage being more than ten percent more than the magnitude of said second voltage, and a capacitor connected between said first motor terminal and said fourth motor terminal.

55. A squirrel-cage induction motor having four motor terminals with a first winding connected between a first motor terminal and a second motor terminal, a second winding connected between said second motor terminal and a third motor terminal, a third winding connected between said third motor terminal and a fourth motor terminal, a two-wire single-phase power supply, a first wire of said power supply connected to said first motor terminal, the second wire of said power supply connected to said third motor terminal, the voltage between said first motor terminal and said second motor terminal being a first voltage, the voltage between said second motor terminal and said third motor terminal being a second voltage, the voltage between said third motor terminal and said fourth motor terminal being a third voltage, the voltage between said first motor terminal and said fourth motor terminal being a fourth voltage, the magnitude of said fourth voltage being more than ten percent more than the magnitude of said third voltage, and a capacitor connected between said first motor terminal and said fourth motor terminal.

56. The method of using a two-wire single-phase supply to excite a three-winding three-phase motor, each winding having first and second terminals with a common reference polarity across said first and second terminals wherein a first terminal of the first one of the said windings is connected to the first wire of the said single-phase supply, and wherein a first terminal of the second one of said windings is connected to the second wire of the said supply, and wherein the second terminal of the said first winding is connected to the second terminal of the said first winding, and wherein the first terminal of the third said winding is also connected to the said second wire, and wherein the second terminal of the said third winding is excited by a composite current generated by the sum of two different alternating currents with different phase angles.

57. A method as in claim 56, wherein the phase of one of the said two different alternating currents leads the phase of the other of the said two different alternating currents by approximately thirty degrees.

58. A method as in claim 56, wherein one of the said two different alternating currents is generated by a capacitor connected to the first said wire of the said supply, and wherein the other of the said two different alternating currents is generated by a capacitor connected to the said second terminal of the said first winding.

59. A method as in claim 56, wherein said composite current contributes to the flux field in the motor so that the resultant flux field in the motor rotates at approximately constant angular velocity and is approximately constant in magnitude.

60. A three-phase motor with three terminals and a single-phase power supply with two lines, wherein the first line of the said power supply is connected to the first terminal of the said motor, the second line of the said power supply is connected to the second terminal of the said motor, an autotransformer with four taps, the first tap connected to the said first terminal, the second tap connected to the said second terminal, a first series circuit of a first capacitor and a first switch connected between the third tap of the said autotransformer and the third terminal of the said motor, and a second series circuit of a second capacitor and a second switch connected between the fourth tap of the said autotransformer and the third terminal of the said motor.

61. A motor as in claim 60, including a third series circuit of a third capacitor and a third switch connected between the third terminal of the said motor and the second tap of the said autotransformer.

62. A motor as in claim 60, including sensing the voltage on the said third terminal of the motor, and controlling the open and closed states of the said first switch responsive to the said sensed voltage.

63. A motor as in claim 60, including sensing the voltage on the said third terminal of the motor, and controlling the open and closed states of both of the said first switch and of the said second switch responsive to the said sensed voltage.

64. A motor as in claim 61, including sensing the voltage on the said third terminal of the motor, and controlling the open and closed states of the said first switch responsive to the said sensed voltage.

65. A motor as in claim 61, including sensing the voltage on the said third terminal of the motor, and controlling the open and closed states of the said first switch and of the said second switch and of the said third switch responsive to the said sensed voltage.

66. A motor as in claim 63, wherein the said sensed voltage is responsive to the motor shaft torque, and wherein the first and second switches are closed when the shaft torque is maximum and the sensed voltage is minimum.

67. A motor as in claim 63, wherein the said sensed voltage is responsive to the motor shaft torque, and wherein the first and second switches are open when the shaft torque is minimum and the sensed voltage is maximum.

68. A squirrel-cage electrical induction machine having four machine terminals with a first winding connected between a first machine terminal and a second machine terminal, a second winding connected between said second machine terminal and a third machine terminal, a third winding connected between said third machine terminal and a fourth machine terminal, a two-wire single-phase power system, a first wire of the said power system connected to said first machine terminal, the second wire of the said power system connected to said third machine terminal, and means for connecting a capacitor between said first machine terminal and said fourth machine terminal.

69. An electrical machine as in claim 68, including means for connecting a second capacitor between said second machine terminal and one of the wires of the said single-phase power system.

* * * * *

UNITED STATES PATENT AND TRADEMARK OFFICE
CERTIFICATE OF CORRECTION

PATENT NO. : 5,300,870
DATED : April 5, 1994
INVENTOR(S) : Otto J. M. Smith

It is certified that error appears in the above-indentified patent and that said Letters Patent is hereby corrected as shown below:

Column 7, line 55: "C1-1o" should be C1-10".

Column 12, line 16, delete the " after dominant.

Column 13, line 55, "Dv" should be "DV".

Column 18, line 11, "994" should be "99%".

Column 23, line 25, "terminal I" should be "terminal,".

Column 23, line 38 first "a" should be "A".

Column 24, line 40, "wy" should be "wye".

Column 24, line 60, "would" should be "wound".

Column 26, line 24, first "as" should be "are".

UNITED STATES PATENT AND TRADEMARK OFFICE
CERTIFICATE OF CORRECTION

PATENT NO. : 5,300,870
DATED : April 5, 1994
INVENTOR(S) : Otto J.M. Smith

It is certified that error appears in the above-indentified patent and that said Letters Patent is hereby corrected as shown below:

Column 25, line 29, "FIG" should be "FIGS".

In Figure 10, R7 should be connected to DV- rather than DV+, and the lower capacitor CD should be connected to DV-, not DV+.

Signed and Sealed this

Twenty-seventh Day of December, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,300,870
DATED : April 5, 1994
INVENTOR(S) : Otto J. M. Smith

It is certified that error appears in the above-indentified patent and that said Letters Patent is hereby corrected as shown below:

Col. 37,
Claim 56, line 11, "first winding" should read

--second winding--.

Signed and Sealed this

Twenty-first Day of May, 1996

Attest:

BRUCE LEHMAN

*Attesting Officer*          *Commissioner of Patents and Trademarks*